(12) United States Patent
Machida et al.

(10) Patent No.: US 6,879,430 B2
(45) Date of Patent: Apr. 12, 2005

(54) IMAGE DISPLAY MEDIUM AND IMAGE WRITING DEVICE

(75) Inventors: Yoshinori Machida, Ashigarakami-gun (JP); Yasufumi Suwabe, Ashigarakami-gun (JP); Yoshiro Yamaguchi, Ashigarakami-gun (JP); Takeshi Matsunaga, Ashigarakami-gun (JP); Motohiko Sakamaki, Ashigarakami-gun (JP); Kiyoshi Shigehiro, Ashigarakami-gun (JP)

(73) Assignee: Fuji Xerox Co., Ltd., Tokyo (JP)

(*) Notice: Subject to any disclaimer, the term of this patent is extended or adjusted under 35 U.S.C. 154(b) by 0 days.

(21) Appl. No.: 10/347,296

(22) Filed: Jan. 21, 2003

(65) Prior Publication Data

US 2004/0051934 A1 Mar. 18, 2004

(30) Foreign Application Priority Data

Aug. 29, 2002 (JP) ........................... 2002-250214

(51) Int. Cl.[7] ............................ G02B 26/00; G09G 3/34
(52) U.S. Cl. ......................................... 359/296; 345/107
(58) Field of Search ........................ 359/296; 345/107, 345/84; 204/450, 600; 430/32, 38

(56) References Cited

U.S. PATENT DOCUMENTS

| | | | | |
|---|---|---|---|---|
| 4,203,106 A | * | 5/1980 | Dalisa et al. | 345/107 |
| 6,113,810 A | * | 9/2000 | Hou et al. | 252/572 |
| 6,144,361 A | * | 11/2000 | Gordon et al. | 345/107 |
| 6,664,944 B1 | * | 12/2003 | Albert et al. | 345/107 |
| 2003/0043450 A1 | * | 3/2003 | Liang et al. | 345/107 |
| 2003/0048522 A1 | * | 3/2003 | Liang et al. | 359/296 |

FOREIGN PATENT DOCUMENTS

| | | |
|---|---|---|
| JP | A 2001-33833 | 2/2001 |
| JP | A 2001-242492 | 9/2001 |
| JP | A 2001-312225 | 11/2001 |

OTHER PUBLICATIONS

Gugrae–Jo et al., "New Toner Display Device (II)", Japan Hardcopy, pp. 10–13, Fall 1999.
Gugrae–Jo et al., "New Toner Display Device (I)", Japan hardcopy, pp. 249–252, 1999.

* cited by examiner

*Primary Examiner*—Georgia Epps
*Assistant Examiner*—William Choi
(74) *Attorney, Agent, or Firm*—Oliff & Berridge, PLC

(57) ABSTRACT

An image display medium which implements multi-color display with a small number of kinds of particles and avoids a reduction in resolution of images, and an image writing device. The image display medium has a structure with a transparent display substrate, a colored back substrate, a spacer for constantly maintaining inter-substrate space, and white particles and black particles. The image display device is provided with the image display medium, an electrode head and a voltage application section. The electrode head implements monochrome display by moving the white particles and the black particles one to the display substrate side and the other to the back substrate side, by applying dc voltages between the substrates. When multi-color display is to be implemented, the electrode head applies ac voltages between the substrates and moves the particles to peripheries of portions so as to expose the back substrate at those portions.

16 Claims, 15 Drawing Sheets

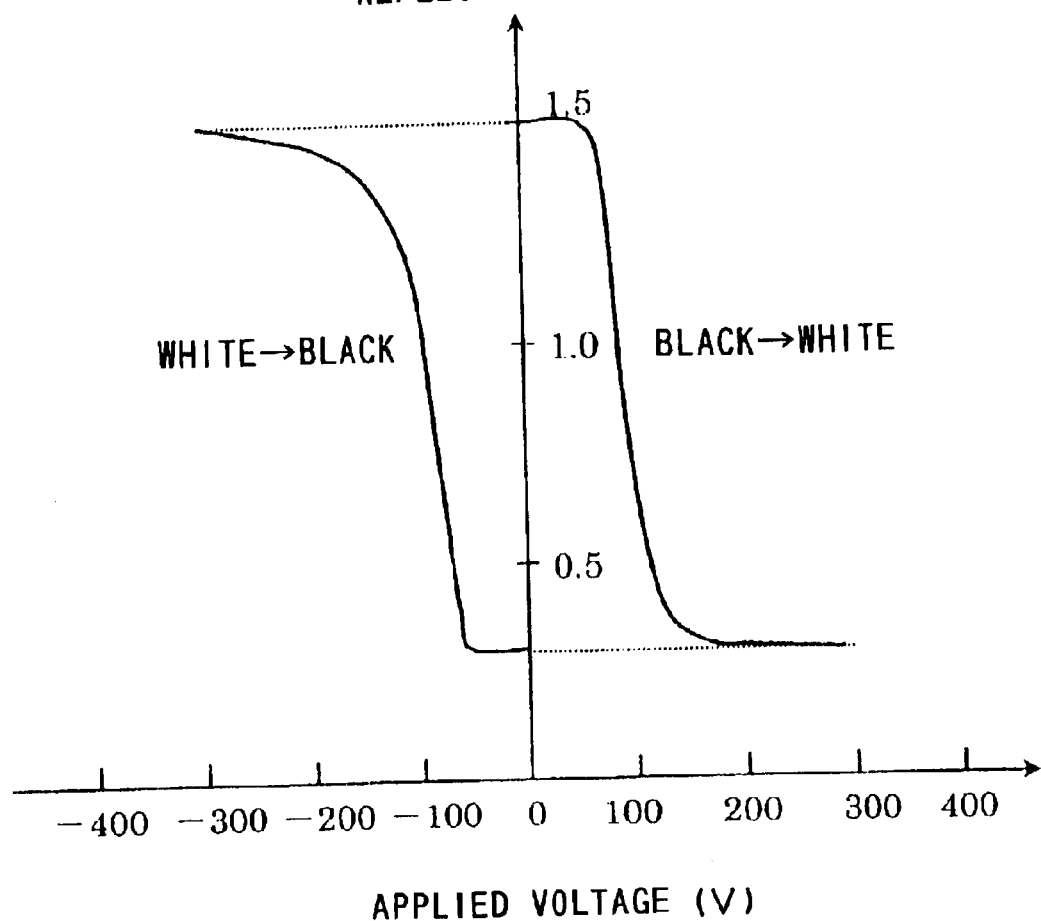

IMAGE DISPLAY MEDIUM AND IMAGE WRITING DEVICE

BACKGROUND OF THE INVENTION

1. Technical Field

The present invention relates to an image display medium in which colored particles are driven by electric fields for implementing repeatedly rewritable display, and to an image writing device that utilizes the image display medium.

2. Description of the Related Art

Heretofore, repeatedly rewritable image display mediums with excellent storage of a displayed image have been proposed. For example, a twisting ball display (display by rotation of particles that are portionally coated with two separate colors), magnetophoresis-type display mediums, thermal rewritable display mediums, liquid crystals having memory, and the like have been suggested thereas.

However, these image display mediums have problems in that they are unable to display white as ordinary paper does and image contrast is low.

Image display mediums that utilize two kinds of colored particles having different colors have been proposed as image display mediums for solving the problem mentioned above. For example, an image display medium described in Japan Hardcopy '99 Papers, pp. 249–252 and Japan Hardcopy '99 Fall Proceedings, pp. 10–13, is structured with a transparent display substrate, a back substrate which opposes the display substrate with a very small gap therebetween, and electro-conductive black toner and insulative white toner enclosed between the substrates. Electrodes are formed at the display substrate and the rear substrate, and an inner face of each electrode is coated with a charge transport material which transports charge carriers of only one polarity (for example, positive holes). When an electric field is applied between these substrates, the positive holes are injected only to the electro-conductive black toner, and the black toner is positively charged. Thus, the black toner pushes between the white particles in response to the electric field formed between the substrates, and moves between the substrates. Black display is implemented when the black toner is moved to the display substrate side, and white display is implemented by the white particles when the black toner is moved to the back substrate side.

A further image display medium described in Japanese Patent Application Laid-Open No. 2001-33833 is structured with opposing substrates provided with an electro-conductive layer or a commutative layer, at least a display face side being transparent, and two kinds of colored particles, which have mutually different colors and are not affected by charges of the same polarity, enclosed between the substrates. In this image display medium, charge transfer from the electro-conductive layers or commutative layers to the colored particles is implemented, colored particles to which charge has been donated are moved by operation of an electric field, and an arbitrary kind of the colored particles is adhered to the display substrate. Thus, image display is implemented.

A still further image display medium described in Japanese Patent Application Laid-Open No. 2001-312225 is structured with a transparent display substrate, a back substrate which opposes the display substrate with a very small gap therebetween, and two kinds of particle groups, which have different colors and charge polarities, enclosed between the substrates. The two kinds of particle groups are charged with mutually opposite polarities. When voltage is applied between the substrates, the particle groups move to different substrate sides from one another. Image display is implemented by applying voltage between the substrates in accordance with image information, and adhering arbitrary kinds of the colored particles to the display substrate.

A yet further image display medium described in Japanese Patent Application Laid-Open No. 2001-242492 is structured with a pair of substrates, at least a display surface side of which is transparent, a highly insulative uncolored dispersion medium enclosed between the substrates, and at least two kinds of electrophoretic fine particles, which have mutually different electrophoresis characteristics, enclosed between the substrates. The two different kinds of electrophoretic fine particles are composed of on the one hand white particles and on the other hand colored particles having a different color tone from the white particles. The two kinds of particles are charged to mutually opposite polarities. When voltage is applied between the substrates, the two kinds of particles move to different substrate sides from one another. Image display is implemented by applying voltage between the substrates in accordance with image information, and adhering arbitrary kinds of the colored particles to the display substrate.

In these image display mediums, images are displayed by adhering either one of two kinds of colored particles at a transparent display substrate face in accordance with image information. By using colored particles with high light suppression characteristics, image display with high clarity of contrast can be implemented by the two kinds of particles having different colors.

In order to implement multi-color display with an image displaying medium that employs two kinds of colored particles having different colors, first, there is a type of display for displaying multi-color images in which color filters are formed at a display substrate. When a color filter has been formed at a display substrate, a mixed color of a color of particles that are adhered at an inner face of the display substrate and the color of the color filter is displayed. For example, if white particles and black particles are employed, then the color of the color filter is displayed when the white particles are adhered at the display substrate, and black display is implemented when the black particles are adhered thereat. As such color filters, for example, R, G and B filters may be employed, and a single color pixel can be structured by three or more neighboring pixels of red, green, and blue. The black and white particles are moved in accordance with image signals, and reflection of R, G and B light is controlled. Thus, arbitrary colors can be displayed.

A method in which a cell structure is divided up by a spacer between a display substrate and a back substrate, colored particles having different colors are enclosed in the respective cells, and a single color is expressed by a number of neighboring cells has been offered as another method. For example, there is a case in which three kinds of particle combinations, that is, black particles and red particles, black particles and green particles, and black particles and blue particles, are enclosed in respective cells in a regular manner, and a single color pixel is expressed by three neighboring cells of red, green and blue. The black particles and the red, green and blue particles are moved in accordance with image signals, and reflection of R, G and B light can be controlled to display freely selected colors.

However, because in these methods a single color pixel is expressed by a plurality of pixels which control light reflection of each of red, green and blue, resolution of a displayed image is reduced. In particular, a deterioration of text quality is remarkable. To maintain resolution for text display, it is necessary to produce display mediums of higher resolution, but higher costs for driving circuits and increases in production costs are unavoidable.

Furthermore, in the multi-color display methods described above, white display is affected by a grayish tone, and whiteness of the display, which is a major feature for image display mediums that employ colored particles, is lost. Moreover, because a color is displayed by the color of a selection of red, green and blue juxtaposed in a color pixel, the multi-color display is dark overall. This is acceptable in an environment in which the surroundings are bright, but in an environment in which the surroundings are dark, there is a problem in that a deterioration of display quality of the multi-color display image is remarkable.

In the multi-color display methods described above, a deterioration in text quality due to a reduction of resolution, a reduction in white display quality or black display quality, a reduction in display quality of multi-color images in an environment in which the surroundings are dark, and the like are fundamental problems that cannot be ameliorated even if the color structure of color filters, the color combinations of the enclosed colored particles and the like are changed.

SUMMARY OF THE INVENTION

The present invention has been devised in consideration of the circumstances described above, and one object of the present invention is to provide an image display medium and image writing device which can implement multi-color display with a small number of kinds of particle groups, and which can avoid a reduction in image resolution.

A first aspect of the present invention for solving the aforementioned problems is an image display medium. This image display medium includes: a display substrate which is at least translucent; a back substrate opposing the display substrate with a gap therebetween; and at least one kind of particle group differing in color from the back substrate and being sealed between the substrates so as to be movable between a plurality of divisions, into which plurality of divisions inter-substrate space between the display substrate and the back substrate is divided, in accordance with electric fields formed by voltages applied between the substrates at the respective divisions.

According to this invention, the particle group whose color is different from the color of the back substrate is enclosed between the substrates. In addition, the particle group is divided between the plurality of divisions in a direction (or directions) parallel to a face of the substrates in the inter-substrate space. The particles are enclosed so as to be movable between the plurality of divisions in response to electric fields that are formed by the applied voltages when the voltages are applied to the individual divisions between the substrates. That is, the particle group is enclosed such that, as well as being able to move between the display substrate and the back substrate, the particle group is moveable in the direction parallel to the substrate face.

Thus, because the color of the back substrate is different from the color of the particle group, it is possible to display many colors with a small number of kinds of particles by moving the particles in the direction parallel to the display substrate face such that the back substrate is observable from the display substrate side. The color of a material of the back substrate itself may be different from the color of the particle group, or the surface of at least a side of the back substrate that opposes the display substrate may be colored, with this color being different from the color of the particle group. Further, it is sufficient if there is only one kind of particle group. In a case in which only one kind of particle group is used, it is possible to implement two-color display by combination with the color of the back substrate.

To move the particles to the display substrate side or the back substrate side in accordance with image information, dc voltage or alternating voltage may be applied so as to form a dc electric field or an ac electric field, for a first predetermined number of cycles (one or more cycles), between the display substrate and the back substrate at a position at which movement of the particles is desired. Consequently, the particle groups are moved in a direction orthogonal to the display substrate surface. As a result, the particles move to the display substrate side or the back substrate side in accordance with the image information. When display at the display substrate side (exposure) of the surface of the back substrate is desired in accordance with the image information, alternating voltage may be applied so as to form an ac electric field for a second predetermined number of cycles (a large number of cycles), which is higher than the first predetermined number of cycles, between the display substrate and the back substrate at a position at which display of the back substrate is desired. Consequently, the particles are moved in the direction parallel to the display substrate face. As a result, the particles at the position at which display of the back substrate is desired move to a periphery of that position, and it is possible to display the color of the back substrate.

In an image display medium according to the first aspect of the present invention, a plurality of kinds of particle group which differ in color and charge characteristics may be used as the particle group. As a result, it is possible to display a greater number of colors. For example, the plurality of kinds of particle group may be a white particle group and a black particle group. Consequently, a black-and-white display with high contrast can be implemented, and other colors can be displayed using the color of the back substrate. Furthermore, when implementing monochrome display, because the color of the back substrate is irrelevant, the resolution of the monochrome display is not reduced.

A structure may be provided in which, of the plurality of divisions, the color of the back substrate at at least one of the divisions is different from the color of the back substrate at a neighboring other division. As a result, a greater number of colors can be displayed with a small number of kinds of particle.

In addition, for example, the back substrate may be structured such that various colors of the divisions of the back substrate include red, green and blue. As a result, a multiplicity of colors can be displayed by combining the respective colors, by moving particle groups that are present at the respective divisions to peripheries thereof in combinations of the colors whose display is desired. Furthermore, by choosing black and white particle groups, whiteness of a white display will not be adversely affected, and graying of a black display can be avoided.

The back substrate may be structured such that the various colors of the divisions of the back substrate include yellow, magenta and cyan. As a result, image display can be made brighter than with red, green and blue, by combining the spectral reflection characteristics of yellow, magenta and cyan.

In such image display mediums, when multi-color image display that displays the colors of the back substrate is implemented, the particles are moved from desired locations to peripheries thereof. However, there may be cases in which deviations in distribution of the particles in the image display medium occur when multi-color images are displayed repeatedly. Such deviations of the particles can be made uniform by applying an alternating electric field between the substrates. But in cases where a degree of deviation is high, a period of time may be required for this uniformization.

Accordingly, one or more spacers may be further provided for partitioning the inter-substrate space into cells that include portions of the plurality of divisions.

As a result, because the inter-substrate space is partitioned into the cells, deviation of the particles is limited to within the cells, and uniformization of distribution of the colored particles can be carried out in a short time by application of an alternating electric field.

As an image display method for the image display medium, there are: a method of writing the whole of a display region at the same time; a scanning-type method for implementing image writing which carries out sequential image writing for each of image rows which are lined up in a pre-established direction of the image recording medium; and the like. However, in the case of scanning-type image writing, at locations at which the particles are moved aside, there may be cases in which the particles are moved back by image writing of a subsequent row. In response thereto, by carrying out a plurality of repetitions of image writing, the colored particles can be assuredly moved from locations at which moving aside is required to locations at which moving aside does not occur, and preferable display of a multi-color image can be implemented.

However, because the duration of image writing when carrying out a plurality of repetitions of image writing is long, portions of the back substrate that respectively correspond to the plurality of divisions may have rectangular shapes, with the plurality of divisions being adjacent to one another at long sides thereof, and a spacer may partition the inter-substrate space so as to structure the cells in a direction intersecting that length direction. In this case, the image writing direction is set to be the length direction of the divisions. As a result, movement of the particles in the image writing direction is restricted by the spacer. Therefore, even when scanning-type image writing is carried out, movement of the particles to a location from which the particles have already been removed, by image writing of a subsequent row of pixels, will not occur. Consequently, scanning-type image writing can be implemented with a single scan, and the image writing duration can be greatly shortened. In a case in which a plurality of rows are to be written at the same time in scanning-type image writing, the cells may be structured such that image writing can be carried out for all of a plurality of pixel rows in one of the cells at one time.

Furthermore, the cells may be structured so as to include portions of the plurality of divisions that respectively differ in color of the back substrate; for example, a structure with narrow cells such that each cell includes one each of divisions that mutually differ in color of the back substrate. As a result, deviation of the particle distributions in the image display medium can be further prevented, and uniformization of the particle positions can be further shortened. In addition, an image writing duration for scanning-type image writing can be shortened.

In the present invention, electrodes for applying voltage may be provided at the display substrate and the back substrate, for generating the aforementioned electric fields. At least electrodes provided at the display substrate are transparent electrodes. When electrodes are provided to the image recording medium in this way, a separate image writing device is not required. Furthermore, in such a case, at least one of the display substrate and the back substrate may have a structure in which the electrode thereof is a group of isolated electrodes.

The electrodes may be pluralities of linear electrodes, and may have a structure in which linear electrodes provided at the display substrate and linear electrodes provided at the back substrate are respectively disposed so as to intersect each other. Accordingly, costs of an image writing device can be made lower in comparison to a case in which isolated electrodes are provided.

The structure of the image display medium may also be such that the back substrate is translucent. In such a case, the structure may be further provided with a back light which irradiates light from outside the back substrate toward the display substrate. With this structure, the image can be displayed more brightly.

An image writing device of a second aspect of the present invention includes a voltage application apparatus which applies voltages to the image display medium of the first aspect for selectively generating at least one of dc electric fields and ac electric fields in order to move the particle group in the inter-substrate space at the respective divisions.

Specifically, in order to move the particles to the display substrate side and/or the back substrate side in accordance with image information, the voltage application apparatus applies dc voltage and/or alternating voltage between the display substrate and the back substrate at locations at which movement of the particles is desired, so as to form a dc electric field and/or an ac electric field for the first predetermined number of cycles, in order to move the particle group in the direction orthogonal to the display substrate face. Consequently, the particles move to the display substrate side and/or the back substrate side in accordance with the image information. Further, where display (exposure) at the display substrate side of the colored surface of the display back substrate is desired in accordance with the image information, alternating voltage may be applied so as to form an electric field for the second predetermined number of cycles, which is higher than the first predetermined number of cycles, in order to move the particles that are between the display substrate and the back substrate at a location at which display of the back substrate is desired in the direction parallel to the display substrate surface. Consequently, the particles at the location at which display of the color of the back substrate is desired move to peripheries thereof, and the color of the back substrate can be displayed.

Further, the voltage application apparatus may be formed with a plurality of electrodes disposed in a line, and may apply voltage for creating electric fields while moving, relative to the image display medium, parallel to the image display surface at an outer side of the image display surface. In such a case, the particles can be assuredly moved from locations from which the particles are to be removed to locations at which the particles are not to be removed by, for example, repeating the application of voltage for a plurality of repetitions, and display of an excellent multi-color image can be implemented. Moreover, because resolution of the image display is determined by resolution of the electrode head, it is simple to increase the resolution.

In a case in which multi-color image display is implemented by colors of the particle group and the back substrate, the voltage application apparatus may perform control of application of a first voltage and subsequently application of a second voltage. The first voltage is a voltage for forming a dc electric field or an ac electric field, for the first predetermined number of cycles, between the substrates, in order to move the particle group in the direction intersecting the display substrate face in accordance with image information. The second voltage is a voltage for forming an alternating electric field for the second predetermined number of cycles, which is higher than the first predetermined number of cycles, in order to move the particle group in the direction parallel to the display substrate face in accordance with the image information.

In, for example, a case in which a multi-color image of three or more colors is to be displayed, control is often carried out by applying a dc electric field or an alternating electric field for the first predetermined number of cycles, which field is capable of moving charged particles between the substrates in accordance with image information, to implement image display with two kinds of particles, and subsequently effecting an alternating electric field for the second predetermined number of cycles, which is higher than the first predetermined frequency, to display color of the back substrate by moving the particles to peripheries. By first implementing image display with the two kinds of colored particles and then implementing color display of the back substrate in this manner, display is performed from a state, at the time of image display by the two kinds of colored particles, in which particle distributions are uniform. Therefore, favorable image display with little noise can be implemented. Furthermore, because the particles are then moved aside at the time of displaying the back substrate, with the two kinds of particles moving at the inside having already moved to the display substrate or the back substrate, the image that is already displayed by the two kinds of particles is not adversely affected, and high quality image display can be implemented.

A structure is also possible that is provided with an image erasure apparatus, which erases a display image that is displayed at at least one cell by applying alternating voltage to all the divisions that are included at the at least one cell.

In an image display medium of the present invention, in a state in which a multi-color image is displayed by exposure of the back substrate, the particles are in a state of being unevenly distributed between the substrates. When display of a successive image is implemented by moving the particles from this state, display noise occurs because of the distribution state of the particles. Consequently, when display of an image is to be implemented by inter-substrate movement of the particles after display of a multi-color image, it is preferable to put particles into a state in which the particles are evenly distributed in the inter-substrate space. By effecting an alternating electric field over the whole of a display region of the image display medium simultaneously using the image erasure apparatus, the unevenly distributed particles can be returned to a state of homogeneous distribution.

If multi-color images are to be successively displayed, it is possible to consecutively display the multi-color images without returning the colored particles to the state of homogeneous distribution between the substrates, but there may be cases in which large deviations in the distribution of the colored particles in the image display medium occur as the display of multi-color images is repeated.

Accordingly, when display of multi-color images is to be repeated, it is preferable if, at least before image display, an alternating field capable of moving the charged colored particles at the whole of the display region of the image display medium is effected and deviations of the colored particles are thus made uniform. Further, a display state of the image display medium can be set to a uniform display color with freely selected colored particles in advance, by specifying a final field direction of the alternating electric field such that either one of the two kinds of colored particles is brought to the display substrate side.

In a case in which the image display medium is partitioned into a plurality of cells by a spacer, the alternating electric field may be effected at each of the cell regions at the same time. If the alternating electric field is effected only at a region divided off by the spacer, deviation of the colored particles of the image display medium can be made uniform thereat without moving colored particles outside that region. Accordingly, a size of the image erasure apparatus can be miniaturized to about the size of the cell regions. Further, because erasure of a multi-color image can be implemented at the individual divided regions, image erasure may be implemented only for cells that require erasure of the multi-color image, without unnecessary driving being performed.

BRIEF DESCRIPTION OF THE DRAWINGS

FIG. 31 is a graph showing a relationship between applied voltage and reflection density.

DETAILED DESCRIPTION OF THE EMBODIMENTS

First Embodiment

Below, details of a first embodiment of the present invention will be described with reference to the drawings.

Figure 1:
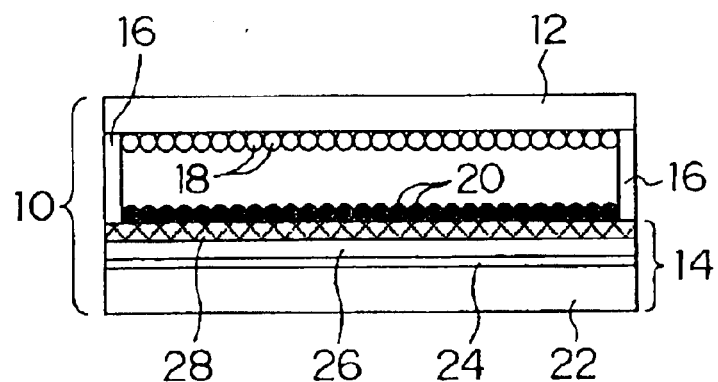
FIG. 1 is a sectional view showing structure of an image display medium relating to a first embodiment.

FIG. 1 shows schematic structure of an image display medium 10 relating to the present invention. The image display medium 10 is structured with a transparent display substrate 12 at a side which is displayed, a colored back substrate 14 which opposes the display substrate 12 with a small gap therebetween, a spacer 16 between the substrates for constantly maintaining inter-substrate spacing, and white particles 18 and black particles 20 which are enclosed (sealed) between the substrates. The white particles 18 serve as first colored particles and the black particles 20 serve as second colored particles, and the white particles 18 and black particles 20 have different electrostatic charge characteristics.

Transparent glass substrates, resin substrates such as acryl and the like, and various kinds of transparent films can be used as the display substrate 12 of the image display medium 10. In the present embodiment, a transparent polycarbonate film with a thickness of 0.05 mm is used.

The back substrate 14 is structured with a glass substrate 22, an ITO electro-conductive layer 24, a white reflection layer 26 and a colored layer 28, which are laminated. The back substrate 14 employs the glass substrate 22, on which the ITO electro-conductive film 24 is formed to a thickness of 1.1 mm. The white reflection layer 26, the whole face of which is printed with white printing ink, is formed on a side of the ITO electro-conductive film 24 formed on the glass substrate 22. Thereon, the colored layer 28, the whole face of which is printed with ink for red color filters, is formed.

It is not required that the glass substrate 22 be particularly transparent. An ordinary resin substrate such as an epoxy substrate or the like, or a sheet-form plastic substrate or the like may be used. Here, the reflectance of the white reflection layer 26 is 88%.

The spacer 16 is applied to the back substrate 14 in the form of a desired pattern by screen printing a thermosetting epoxy resin, curing the same by heating, and repeating the process until a desired height is achieved. In the present embodiment, the height of the spacer 16 is 0.2 mm.

Rather than a printing process, the spacer 16 may be formed by photo-etching with a dry film-type photoresist or the like. Further, the spacer 16 may be formed by adhering a thermoplastic film, which is formed in the desired form by an injection-compression forming or embossing process, or a thermopressing process or the like, to the back substrate 14. It is further possible, with an embossing process or a thermopressing process, to form the spacer 16 integrally with the back substrate 14. Of course, the spacer 16 may be formed at the display substrate 12 side, and may be formed integrally with the display substrate 12, as long as transparency is not adversely affected.

In the present embodiment, spherical white particles of titanium oxide-containing cross-linked polymethyl methacrylate with a volume average diameter of 20 $\mu$m (TECHPOLYMER MBX-20-WHITE, produced by Sekisui Plastics Co., Ltd.), mixed with a fine powder of isopropyl trimethoxysilane-treated titania in a ratio of 100 to 0.1 by weight, are employed as the white particles 18.

As the black particles 20, spherical black particles of carbon-containing cross-linked polymethyl methacrylate with a volume average diameter of 20 $\mu$m (TECHPOLYMER MBX-20-BLACK, produced by Sekisui Plastics Co., Ltd.), mixed with a fine powder of aminopropyl trimethoxysilane-treated AEROSIL A130 in a ratio of 100 to 0.2 by weight, are employed.

The white particles 18 and the black particles 20 are mixed in a ratio of 2 to 1 by weight. At this time, the white particles 18 are negatively charged and the black particles 20 are positively charged. Although the white particles 18 and the black particles 20 are employed in the present embodiment, colored particles of arbitrary colors in a combination other than white and black may be employed, as long as the two kinds of colored particles have different electrostatic charge characteristics.

The mixed particles of the white particles 18 and the black particles 20 are uniformly shaken down through a screen mesh onto the back substrate 14 on which the spacer 16 has been formed, in a proportion of about 4 mg/cm$^2$. Then, the display substrate 12 is superposed with the back substrate 14 to which the colored particles have been applied, the two substrates are adhered with a UV-setting type adhesive, and the image display medium 10 is formed. At this time, an overall volume ratio of the white particles 18 and the black particles 20 with respect to volume of the space between the substrates is about 12%.

Figure 2:
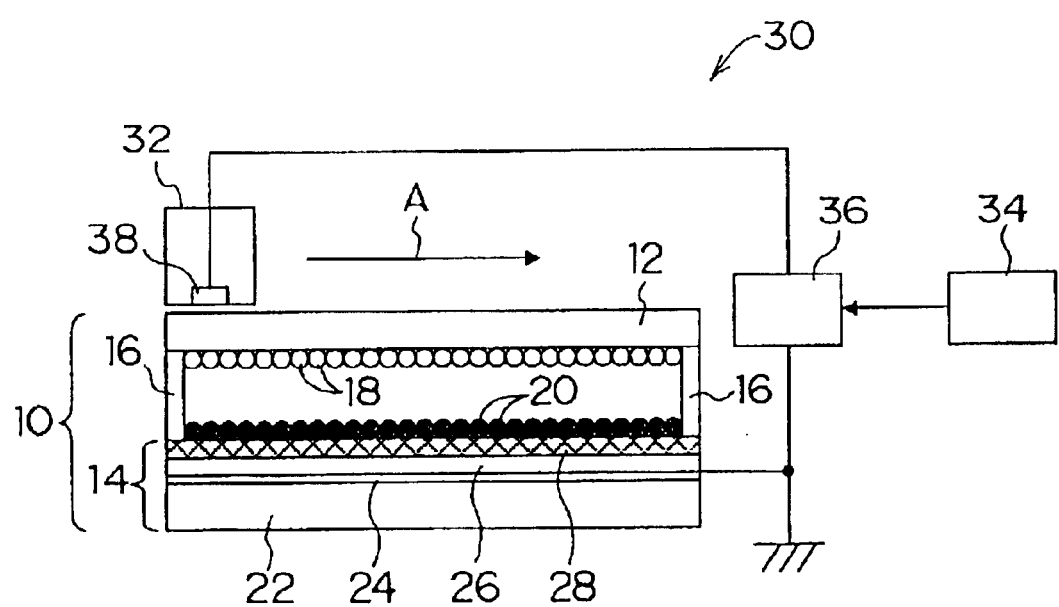
FIG. 2 is a schematic structural view of the image display medium relating to the first embodiment.

FIG. 2 shows general structure of an image display device 30 which utilizes the image display medium 10. The image display device 30 is structured with the image display medium 10, an electrode head 32, and a voltage application section 36. The electrode head 32 serves as an image writing apparatus which selectively forms dc electric fields and/or alternating electric fields between the substrates of the image display medium 10. The voltage application section 36 selectively applies dc voltage or ac voltage to the electrode head 32 in accordance with image information inputted from an external image input apparatus 34 such as a computer or the like. The electrode head 32 and the voltage application section 36 correspond to a voltage application apparatus of the present invention.

Figure 3:
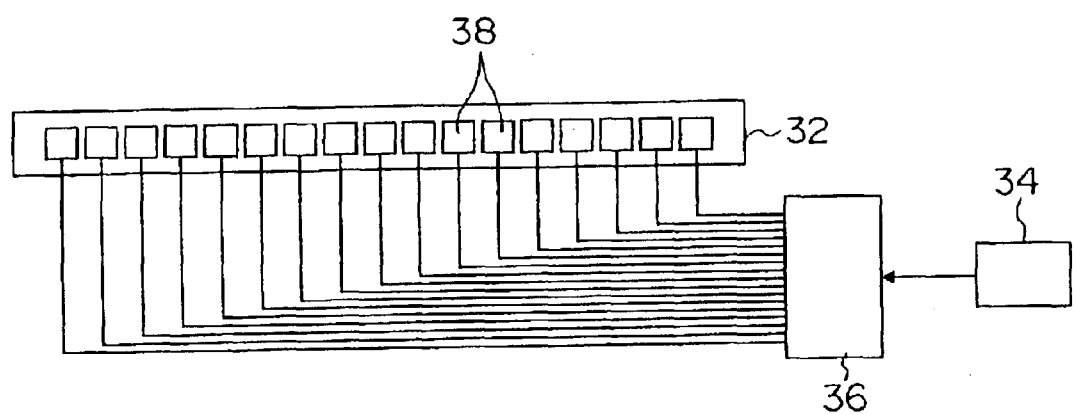
FIG. 3 is a sectional view showing structure of an electrode head.

In the present embodiment, an electrode head at which a plurality of isolated electrodes 38, to which voltages can be applied separately, are regularly disposed is utilized as the electrode head 32, as shown in FIG. 3. More specifically, an electrode head at which 480 0.35 mm by 0.35 mm square electrodes are disposed in a single row at a pitch of 0.4 mm is employed.

The voltage application section 36 applies voltages between the isolated electrodes 38 of the electrode head 32 and the ITO electro-conductive film 24 of the back substrate 14. A substrate in which the ITO electro-conductive film 24 is not provided at the back substrate 14 could be employed, with an electrode being disposed behind the back substrate 14 to oppose the electrode head 32.

Figure 4:
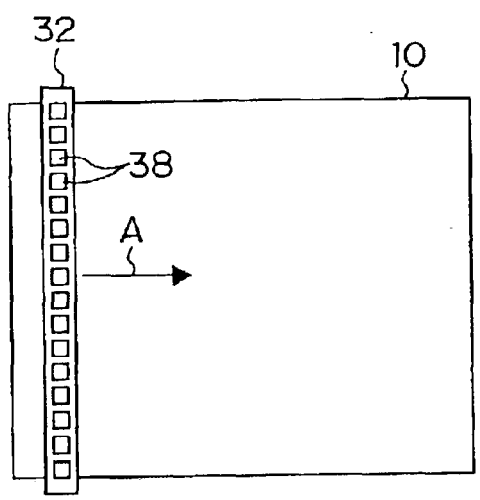
FIG. 4 is a diagram for explaining scanning of the electrode head.

The electrode head 32 is driven along the display substrate side of the image display medium 10 in the direction of an arrow A by an unillustrated driving apparatus, as shown in FIGS. 2 and 4, while applying voltages between the substrates in accordance with the image information from the voltage application section 36. Accordingly, an image is formed at the whole of the image display medium 10 in accordance with the image information inputted from the image input apparatus 34. Alternatively, the electrode head 32 may be fixed with the image display medium 10 being moved, or both thereof may be relatively moved.

Next, an image display process of the image display medium 10 will be described.

Figure 5:
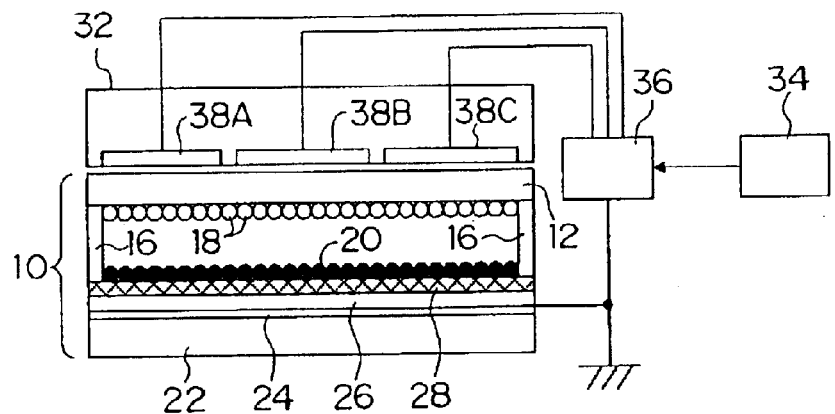
FIG. 5 is a diagram for explaining movement of particles of the image display medium relating to the first embodiment.

FIG. 5 shows an enlarged view of a portion of the image display medium 10 and the electrode head 32, in a white display state in which the white particles 18 are adhered to the display substrate 12.

Figure 6:
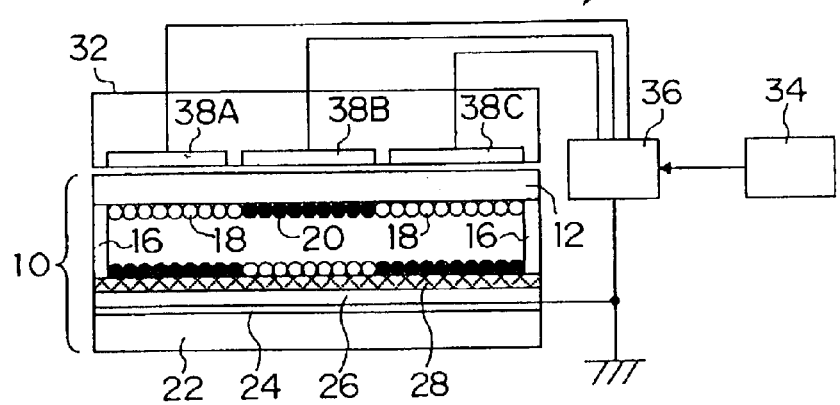
FIG. 6 is a diagram for explaining movement of particles of the image display medium relating to the first embodiment.

Firstly, isolated electrodes 38A and 38C of the electrode head 32 are connected to ground, and a pulse voltage of, for example, −200 V, is applied to an isolated electrode 38B. Consequently, a potential difference is generated only between the isolated electrode 38B and the opposing back substrate 14. Therefore, as shown in FIG. 6, at a region facing the isolated electrode 38B of the image display medium 10, the negatively charged white particles 18 move toward the back substrate 14 side, and the positively charged black particles 20 move toward the display substrate 12 side. Thus, display of a high contrast black dot at the white display face can be implemented.

From the display state shown in FIG. 6, a pulse voltage of, for example, +200 V is applied to the isolated electrode 38B, and at this time the positively charged black particles 20 move toward the back substrate 14 side and the negatively charged white particles 18 move toward the display substrate 12 side. Thus, the image display medium 10 returns to the white display state shown in FIG. 5.

In the same way, by applying pulse voltages of, for example, +200 V and −200 V arbitrarily to the isolated electrodes 38 in accordance with the image information, a high contrast monochrome image display can be implemented. It is sufficient that the applied voltages are voltages of a magnitude capable of moving the particles by generating potential differences between the substrates.

Next, for example, the isolated electrodes 38A and 38C of the electrode head 32 are connected to ground, and an alternating pulse voltage of ±200 V at a frequency of 200 Hz is applied to the isolated electrode 38B. Consequently, the white particles 18 and the black particles 20 in the region facing the isolated electrode 38B move reciprocatingly between the substrates due to an alternating electric field formed between the substrates by the isolated electrode 38B. At this time, the particles move so as to spread in directions of the isolated electrodes 38A and 38C due to edge fields formed between the isolated electrodes 38A and 38B and between the isolated electrodes 38B and 38C. In addition, when the white particles 18 and the black particles 20 move reciprocatingly between the substrates, the white particles 18 and black particles 20 are scatteringly moved in the directions of the isolated electrodes 38A and 38C due to the occurrence of collisions between the particles.

Figure 7:
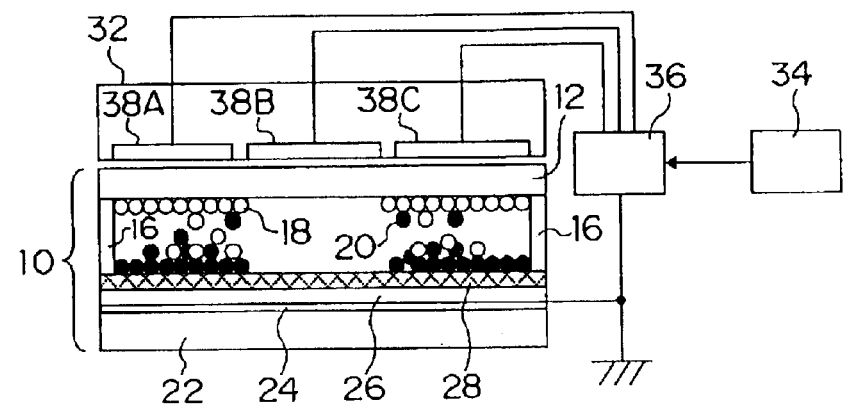
FIG. 7 is a diagram for explaining movement of particles of the image display medium relating to the first embodiment.

As a result, the white particles 18 and black particles 20 that were present in the region facing the isolated electrode 38B move to regions facing the isolated electrodes 38A and 38C, at which the voltage is not applied, as shown in FIG. 7.

As a result, the colored layer 28 formed at the back substrate 14 is shown at the display substrate 12 side, and thus a red color can be favorably observed.

In the same way, by arbitrarily applying alternating pulse voltages of ±200 V at 200 Hz frequency to the isolated electrodes 38 in accordance with the image information, a red image can be displayed in addition to the aforementioned high contrast monochrome display. Thus, a multi-color (three color) image display can be implemented.

In a case in which pixels arranged in the scanning direction of the electrode head 32, shown by the arrow in FIG. 4, are successively displayed in a multi-color display, particles may be moved back, by image writing of subsequent pixels, to pixels from which particles have already been moved aside, and display quality of the multi-color display image may deteriorate. Such a case can be ameliorated by carrying out writing by scanning the electrode head 32 for a plurality of repetitions. As a result of this, particles can be satisfactorily moved, by the plurality of repetitions of image writing by scanning of the electrode head 32, from pixels from which particles are to be moved aside to pixels from which particles are not to be moved aside.

Next, a method for erasing a multi-color display image will be described.

As shown in FIG. 7, in a multi-color display state, the particles are unevenly distributed between the substrates. It is not possible to implement display of a monochrome image in the manner shown in FIG. 6 directly from this state.

Therefore, when a monochrome image display is to be implemented subsequent to a multi-color image display, first, it is necessary to return from the state shown in FIG. 7 to the state shown in FIG. 5 (a state in which the particles are uniformly distributed between the substrates). For this, it is sufficient to form an alternating electric field over the whole of a display region of the image display medium 10 at the same time. However, in the present embodiment, because the linear electrode head 32 in which the electrodes are arranged in a single row as shown in FIG. 3 is used, it is not possible to effect an alternating electric field over the whole display region of the image display medium 10 at the same time. Accordingly, in such a case, image erasure is implemented by a separately provided image erasure apparatus 40, shown in FIG. 8, which effects an alternating electric field at the whole face of the image display simultaneously.

Obviously, if the image writing device is capable of effecting an alternating electric field at the whole face of the display region simultaneously, then the image writing device can be dually used as an image erasure apparatus.

Figure 8:
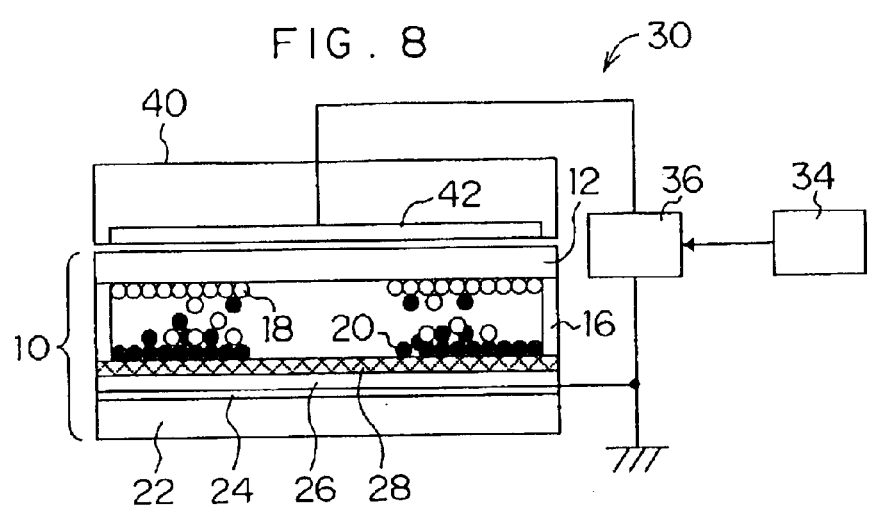
FIG. 8 is a schematic structural view of an image erasure apparatus.

FIG. 8 shows an example of an image erasure apparatus. The image erasure apparatus 40 is provided with an erasure electrode 42 corresponding to the whole display region of the image display medium 10. An alternating pulse voltage is applied thereto by the voltage application section 36. The voltage application section 36 applies voltage between the erasure electrode 42 of the image erasure apparatus 40 and the ITO electro-conductive film 24 of the back substrate 14 in order to erase the image. In a case in which a substrate is employed in which the ITO electro-conductive film 24 is not included at the back substrate 14, a facing electrode, corresponding with the erasure electrode 42, may be disposed behind the back substrate 14.

To the image display medium 10 in the multi-color display state shown in FIG. 8, the image erasure apparatus 40 applies an alternating pulse voltage of ±200 V at 200 Hz frequency to the erasure electrode 42. Consequently, the image display medium 10 can be returned to the display state shown in FIG. 5 in which the white particles 18 and the black particles 20 are uniformly distributed between the substrates. This is due to the particles being scatteringly moved by the occurrence of collisions therebetween and the like when the white particles 18 and the black particles 20 are reciprocatingly moved by an alternating electric field formed between the substrates of the image display medium 10.

By setting a final pulse voltage of the alternating pulse voltage applied at the time of erasure of the multi-color display image to +200 V, the white display state, in which the white particles 18 have all moved toward the display substrate 12, can be specified for after image erasure. By setting the final pulse voltage to −200 V, a black display state, in which the black particles 20 have all moved toward the display substrate 12, can be formed.

Next, taking the uniform white display state shown in FIG. 5 as an initial display state, an alternating pulse voltage of ±200 V at 200 Hz frequency can be applied to the isolated electrode 38B of the electrode head 32 for various numbers of cycles. The final pulse voltage of this alternating pulse voltage is set to be −200 V. Up to a small number of cycles, a favorable black display is implemented. As the number of cycles is increased further however, density of the black display gradually falls. If the number of cycles goes beyond 20 cycles, the particles are almost entirely eliminated and an excellent red color is displayed.

Thus, in the present embodiment, by dc electric fields and/or alternating electric fields for a few cycles being effected between the substrates from outside the image display medium 10 in accordance with image information, a high contrast display image can be provided by two kinds of particles, in the same manner as in conventional image display mediums.

Further, by applying alternating electric fields between the substrates for large number of cycles in accordance with image information, the two kinds of colored particles can be moved from freely selected locations between the substrates to peripheries thereof, and the color of the back substrate, which is colored a desired color, can be displayed. Therefore, a multi-color display is possible. In other words, a three color display can be implemented with two kinds of particles having different colors. Here, a loss of resolution when a black-and-white image and a red image are displayed together does not occur.

Further again, by effecting an alternating electric field at the whole of the display region of the image display medium 10, deviations of particle distribution can be uniformized, and the display state of the image display medium 10 can be simultaneously set to a homogeneous display color with freely selected particles.

Second Embodiment

Next, a second embodiment of the present invention will be described. Parts that are the same as in the embodiment described above are given the same reference numerals, and detailed descriptions thereof are omitted.

Figure 9:
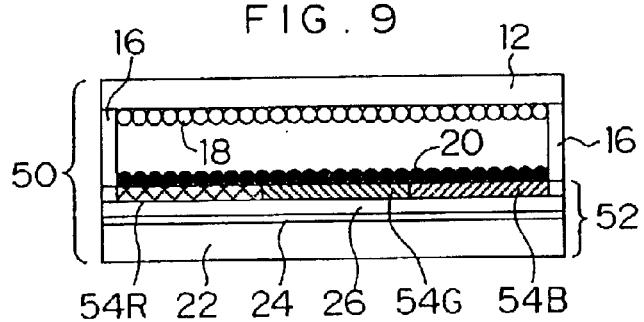
FIG. 9 is a sectional view showing structure of an image display medium relating to a second embodiment.

FIG. 9 shows general structure of an image display medium 50 relating to the present embodiment. The image display medium 50 is structured with the transparent display substrate 12, a colored back substrate 52, the spacer 16, and the white particles 18 and the black particles 20. The display substrate 12 is provided at a side at which an image is displayed. The back substrate 52 opposes the display substrate 12 with a small gap therebetween. The spacer 16, which is for fixedly maintaining inter-substrate spacing, and the white particles 18 and the black particles 20, whose charge characteristics are different, are enclosed between the display substrate 12 and the back substrate 52.

Figure 10:
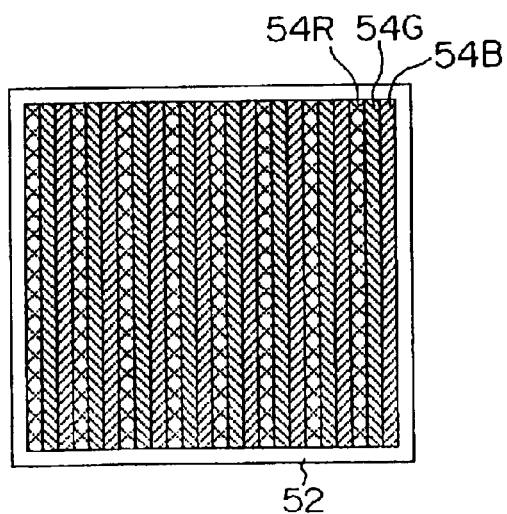
FIG. 10 is a plan view showing the image display medium relating to the second embodiment.

The back substrate 52 is structured with the glass substrate 22, the ITO electro-conductive layer 24, the white reflection layer 26 and a colored layer 54, which are laminated. The back substrate 52 employs the glass substrate 22, on which the ITO electro-conductive film 24 is formed with a thickness of 1.1 mm. The white reflection layer 26, the whole face of which is printed with white printing ink, is formed on a side of the ITO electro-conductive film 24 formed on the glass substrate 22. Thereon, the colored layer 54, which is printed with regularly arranged stripe shapes (longitudinal shapes) with inks for red, green and blue color filters as shown in FIG. 10 (colored layers 54R, 54G and 54B), is formed. In this embodiment, the width of the stripes of each color is set to 0.4 mm, and the stripes are arranged in a repeating sequence of red, green, blue. Here, the reflectance of the white reflection layer 26 is 88%.

Inter-substrate regions over the colored layers 54R, 54G and 54B respectively correspond to divisions of the present invention.

Figure 11:
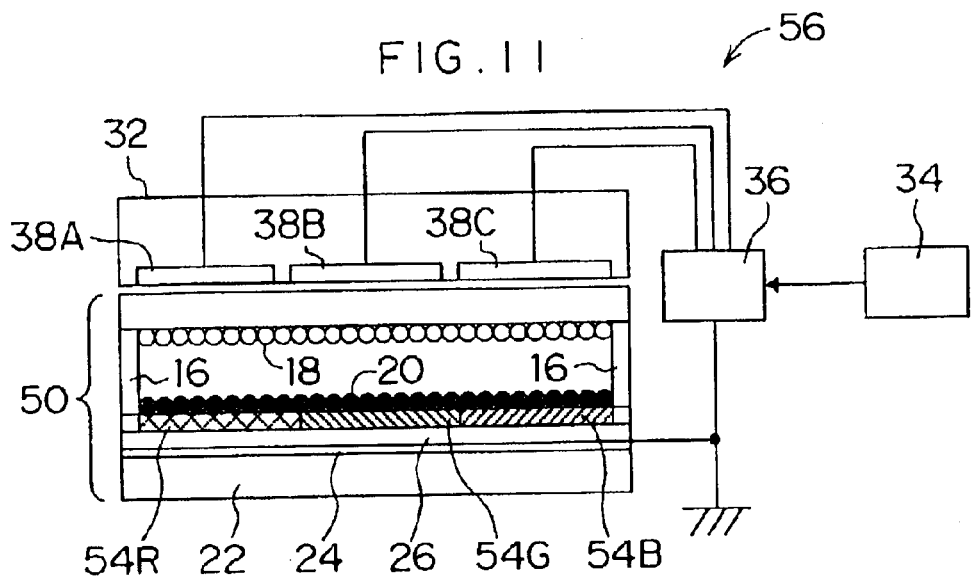
FIG. 11 is a schematic structural diagram of an image display device relating to the second embodiment.

FIG. 11 shows general structure of an image display device 56 which utilizes the image display medium 50. The image display device 56 is structured with the image display medium 50, the voltage application section 36 and the electrode head 32.

The electrode head 32 is the same as the electrode head 32 used in the first embodiment. As shown in FIG. 3, the electrode head at which the 480 isolated electrodes 38, to which voltages can be applied separately, are disposed in a single row at a pitch of 0.4 mm is utilized as the electrode head 32. The size of the isolated electrodes 38 is 0.35 mm by 0.35 mm. In this structure, in order to form an image over the whole face of the image display medium 50, the electrode head 32 is scanned along the display face of the image display medium 50 in the same manner as shown in FIG. 4. In the present embodiment too, the voltage application section 36 applies voltage between the isolated electrodes 38 of the electrode head 32 and the ITO electro-conductive film 24 of the back substrate 52.

Figure 12:
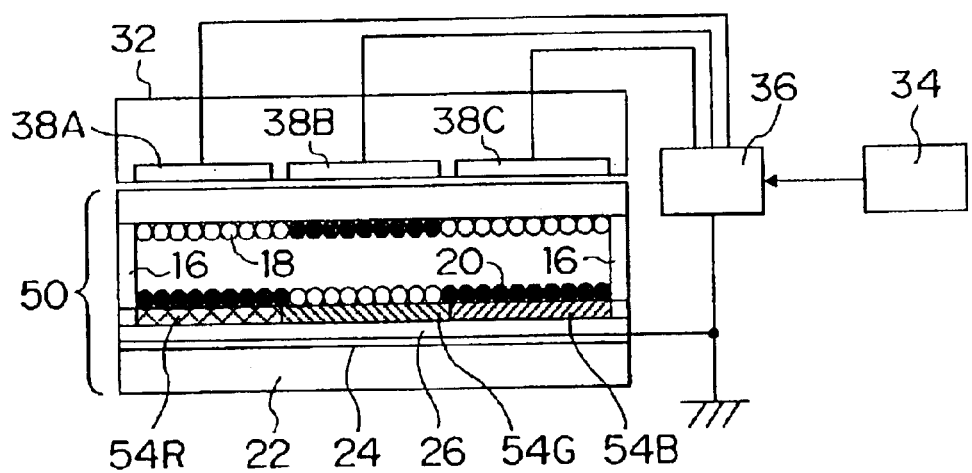
FIG. 12 is a diagram for explaining movement of particles of an image display medium relating to the second embodiment.

Next, an image display process of the image display medium 50 will be described. First, the isolated electrodes 38A and 38C of the electrode head 32 are connected to ground, and a pulse voltage of, for example, −200 V, is applied to the isolated electrode 38B. As a result, excellent black display can be implemented at a region facing the isolated electrode 38B of the image display medium 50, as shown in FIG. 12. Further, if a pulse voltage of +200 V is applied to the isolated electrode 38B, the image display medium 50 can return from the display state shown in FIG. 12 to the white display state shown in FIG. 11.

In this way, high contrast monochrome image display can be implemented by applying pulse voltages of +200 V or −200 V to the isolated electrodes 38 arbitrarily in accordance with image information.

Figure 13:
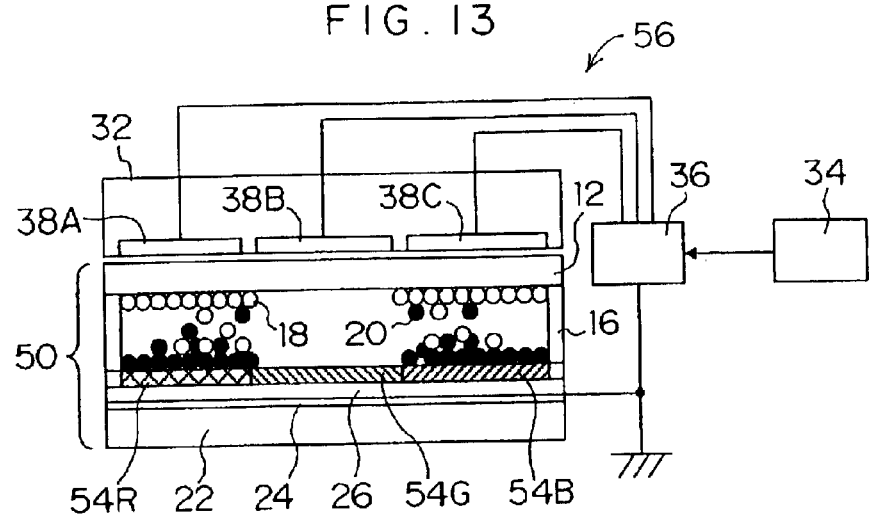
FIG. 13 is a diagram for explaining movement of particles of the image display medium relating to the second embodiment.

Next, the isolated electrodes 38A and 38C of the electrode head 32 are connected to ground, and an alternating pulse voltage of ±200 V at 200 Hz frequency is applied to the isolated electrode 38B. Consequently, the white particles 18 and the black particles 20 are almost entirely eliminated from a region of the image display medium 50 that faces the isolated electrode 38B, as shown in FIG. 13. Thus, the colored layer 54G formed at the back substrate 14 is shown at the display substrate 12 side, and a green color can be favorably observed.

In the same way, if the isolated electrodes 38B and 38C are connected to ground and the alternating pulse voltage of ±200 V at 200 Hz frequency is applied to the isolated electrode 38A, the red color of the colored layer 54R formed at the back substrate 52 can be displayed at the display substrate 12 side, and if the alternating pulse voltage is applied to the isolated electrode 38C, the blue color of the colored layer 54B can be displayed at the display substrate 12 side.

Figure 14:
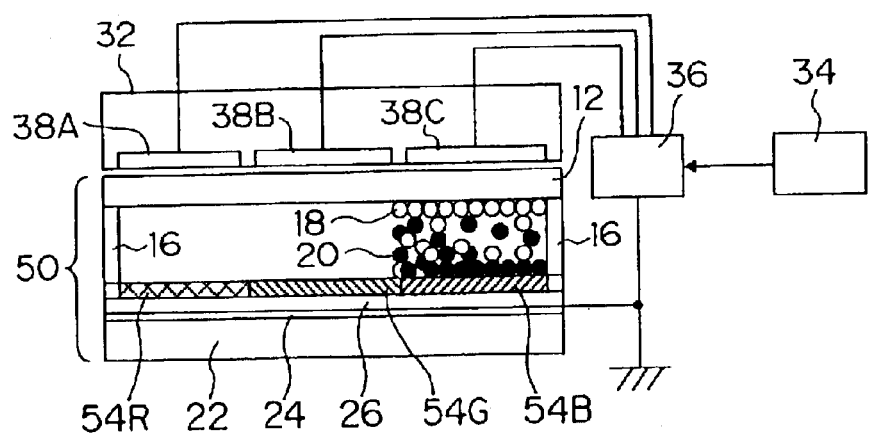
FIG. 14 is a diagram for explaining movement of particles of the image display medium relating to the second embodiment.

Further, if the isolated electrode 38C of the electrode head 32 is connected to ground, and the alternating pulse voltage is applied to the isolated electrodes 38A and 38B, then the white particles 18 and black particles 20 will be almost entirely eliminated from a region of the image display medium 50 that faces the isolated electrodes 38A and 38B, as shown in FIG. 14. Thus, the colored layers 54R and 54G formed at the back substrate 52 can be satisfactorily observed and, by combination of reflected lights from the colored layers 54R and 54G, yellow can be displayed.

Further still, if the alternating pulse voltage is applied to the isolated electrodes 38B and 38C, then, by combination of lights reflected by the colored layer 54G and the colored layer 54B, cyan can be displayed. In the same way, if the alternating pulse voltage is applied to the isolated electrodes 38A and 38C, then, by combination of lights reflected by the colored layer 54R and the colored layer 54B, magenta can be displayed.

Erasure of a multi-color display image can be implemented using the image erasure apparatus 40 in the same way as in the first embodiment. If multi-color displays are to be successively implemented, display of a succeeding multi-color image may be implemented from a multi-color display state, such as those shown in FIGS. 13 and 14, without returning to the white display state shown in FIG. 11 or a black display state.

Thus, in the present embodiment, by dc electric fields and/or low cycle number alternating electric fields being effected between the substrates from outside the image display medium 50 in accordance with image information, a high contrast display image can be provided by two kinds of colored particles, in the same manner as in conventional image display mediums. Here, loss of resolution when a monochrome image is displayed does not occur, and thus is not particularly problematic.

Further, by moving the two kinds of colored particles from freely selected regions of the regularly colored red, green and blue regions at the back substrate 52 to peripheries thereof in accordance with multi-color image information, the colors of the freely selected regions colored red, green and blue at the back substrate 52 can be displayed. Moreover, by expressing individual color pixels by combinations of the regularly disposed red, green and blue, arbitrary colors can be displayed. In other words, pixels of numerous colors can be displayed with two kinds of differently colored particles.

In the present embodiment, because white display is implemented by the white particles 18, whiteness of the white display is not subject to flaws, and because black display is implemented by the black particles 20, the black display will not become gray.

Third Embodiment

Next, a third embodiment of the present invention will be described. Parts that are the same as in the embodiments described above are given the same reference numerals, and detailed descriptions thereof are omitted.

Figure 15:
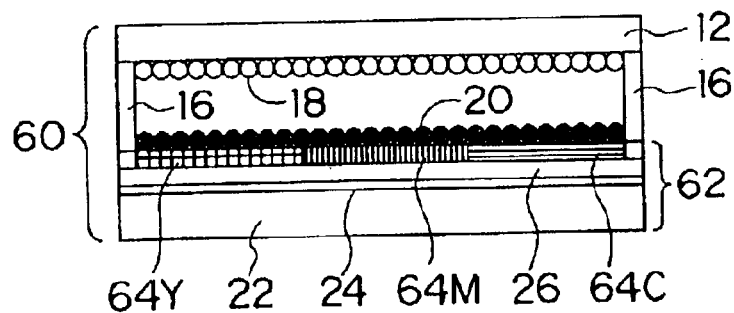
FIG. 15 is a sectional view showing structure of an image display medium relating to a third embodiment.

FIG. 15 shows general structure of an image display medium 60 relating to the present embodiment. The image display medium 60 is structured with the transparent display substrate 12, a colored back substrate 62, the spacer 16, and the white particles 18 and the black particles 20. The display substrate 12 is provided at a side at which an image is displayed. The back substrate 62 opposes the display substrate 12 with a small gap therebetween. The spacer 16, which is for fixedly maintaining inter-substrate spacing, and the white particles 18 and the black particles 20, whose charge characteristics are different, are enclosed between the display substrate 12 and the back substrate 62.

Figure 16:
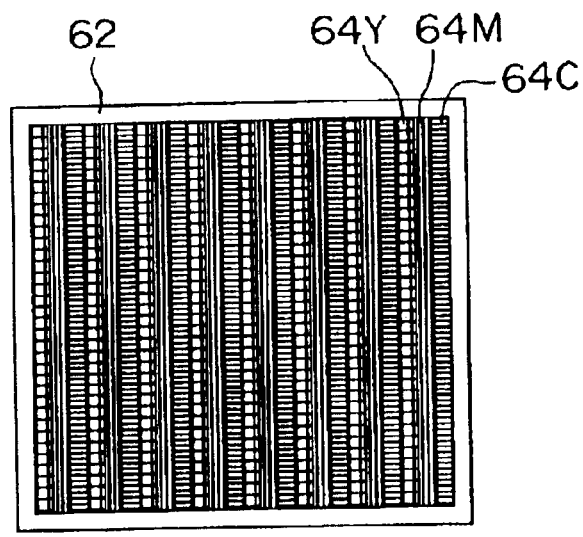
FIG. 16 is a plan view showing the image display medium relating to the third embodiment.

The back substrate 62 is structured with the glass substrate 22, the ITO electro-conductive layer 24, the white reflection layer 26 and a colored layer 64, which are laminated. The back substrate 62 employs the glass substrate 22, on which the ITO electro-conductive film 24 is formed with a thickness of 1.1 mm. The white reflection layer 26, the whole face of which is printed with white printing ink, is formed on a side of the ITO electro-conductive film 24 formed on the glass substrate 22. Thereon, the colored layer 64, which is printed with regularly arranged stripe shapes with inks for yellow, magenta and cyan color filters, to serve as a plurality of divisions as shown in FIG. 16 (colored layers 64Y, 64M and 64C), is formed. In the present embodiment, the width of the stripes of each color is set to 0.4 mm, and the stripes are arranged in a repeating sequence of yellow, magenta, cyan. Here, the reflectance of the white reflection layer 26 is 88%.

Figure 17:
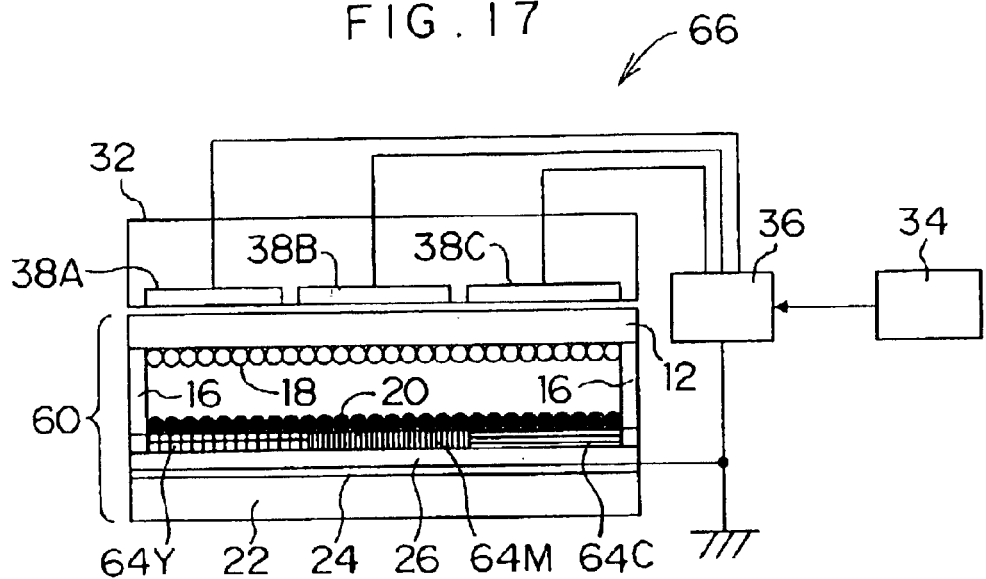
FIG. 17 is a schematic structural view of an image display device relating to the third embodiment.

FIG. 17 shows general structure of an image display device 66 which utilizes the image display medium 60. The image display device 66 is structured with the image display medium 60, the voltage application section 36 and the electrode head 32.

The electrode head 32 is the same as the electrode head 32 used in the first embodiment. As shown in FIG. 3, the electrode head at which the 480 isolated electrodes 38, to which voltages can be applied separately, are disposed in a single row at a pitch of 0.4 mm is utilized as the electrode head 32. The size of the isolated electrodes 38 is 0.35 mm by 0.35 mm. In order to form an image over the whole face of the image display medium 60, the electrode head 32 is scanned along the display face of the image display medium 60 in the same manner as shown in FIG. 4. In the present embodiment too, the voltage application section 36 applies voltage between the isolated electrodes 38 of the electrode head 32 and the ITO electro-conductive film 24 of the back substrate 62.

Next, an image display process of the image display medium 60 will be described. In the same way as in the second embodiment, a high contrast monochrome display can be implemented by applying pulse voltages of +200 V and −200 V to the isolated electrodes 38 arbitrarily in accordance with image information. In addition, by applying alternating pulse voltages of ±200 V at 200 Hz frequency to freely selected isolated electrodes 38 of the electrode head 32, and connecting others of the isolated electrodes 38 to ground, the white particles 18 and black particles 20 at regions at which alternating pulse electric fields are effected can be moved to regions at which the alternating pulse electric fields are not effected, in the same way as in the second embodiment. Thus, the colors of the colored layer 64 formed at the back substrate 62 can be excellently displayed.

For example, if the alternating pulse voltage is applied to the isolated electrode 38A, then the yellow color of the colored layer 64Y formed at the back substrate 62 can be displayed, if the alternating pulse voltage is applied to the isolated electrode 38B, then the magenta color of the colored layer 64M can be displayed, and if the alternating pulse voltage is applied to the isolated electrode 38C, then the cyan color of the colored layer 64C can be displayed.

Further, if the alternating pulse voltage is applied to the isolated electrode 38A and the isolated electrode 38B, then the colored layers 64Y and 64M formed at the back substrate 62 can be satisfactorily observed and, by combination of reflected lights from the colored layer 64Y and the colored layer 64M, red can be displayed. In the same way, if the alternating pulse voltage is applied to the isolated electrodes 38B and 38C, then, by combination of lights reflected by the colored layer 64M and the colored layer 64C, blue can be displayed, and if the alternating pulse voltage is applied to the isolated electrodes 38A and 38C, then, by combination of lights reflected by the colored layer 64Y and the colored layer 64C, green can be displayed.

Erasure of a multi-color display image can be implemented using the image erasure apparatus 40 in the same way as in the first embodiment. If multi-color displays are to be successively implemented, display of a succeeding multi-color image may be implemented without returning to the white display state or the black display state.

Thus, in the present embodiment, a high contrast black-and-white display image can be provided. Here, loss of resolution when a monochrome image is displayed does not occur, and thus is not particularly problematic.

Further, by moving the colored particles from freely selected regions of the regularly colored yellow, magenta and cyan colored layers at the back substrate 62 to peripheries thereof in accordance with multi-color image information, the colors of the freely selected regions colored yellow, magenta and cyan at the back substrate 62 can be displayed. Moreover, by expressing individual color pixels by combinations of the regularly disposed yellow, magenta and cyan, arbitrary colors can be displayed.

Furthermore, because white display is implemented by the white particles 18, whiteness of the white display is not subject to flaws, and because black display is implemented by the black particles 20, the black display will not become gray.

When a multi-color image is displayed, the image display medium 60 relating to the present embodiment provides a brighter display than the image display medium 50 described for the second embodiment. This is due to spectral reflection characteristics of the color layers formed at the back substrate 62. The colored layer 64, combining yellow, magenta and cyan, formed at the back substrate 62 of the image display medium 60 provides greater amounts of reflected light than the colored layer 54 combining red, green and blue that is formed at the back substrate 52 of the image display medium 50.

Fourth Embodiment

Next, a fourth embodiment of the present invention will be described. Parts that are the same as in the embodiments described above are given the same reference numerals, and detailed descriptions thereof are omitted.

Figure 18:
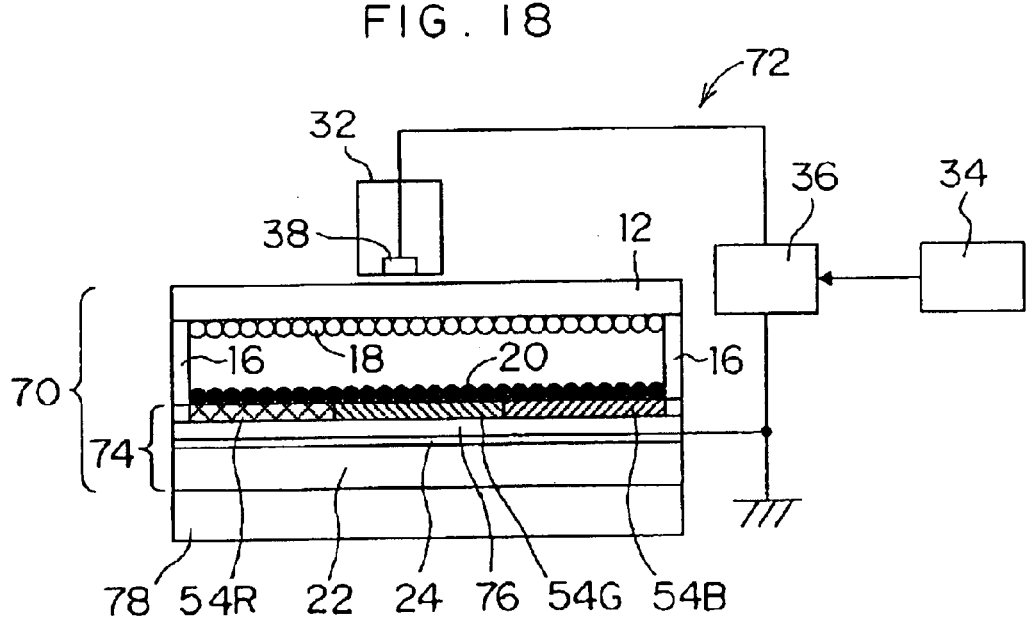
FIG. 18 is a sectional view showing structure of an image display medium relating to a fourth embodiment.

FIG. 18 shows general structure of an image display medium 70 relating to the present embodiment. The image display medium 70 is structured with the transparent display substrate 12, a back substrate 74, the spacer 16, and the white particles 18 and the black particles 20. The display substrate 12 is provided at a side at which an image is displayed. The back substrate 74 opposes the display substrate 12 with a small gap therebetween and is optically transmissive. The spacer 16, which is for fixedly maintaining inter-substrate spacing, and the white particles 18 and the black particles 20, whose charge characteristics are different, are enclosed between the display substrate 12 and the back substrate 74.

The back substrate 74 is structured with the glass substrate 22, the ITO electro-conductive layer 24, a white reflection layer 76 and the colored layer 54, which are laminated. The back substrate 74 employs the glass substrate 22, on which the ITO electro-conductive film 24 is formed with a thickness of 1.1 mm. The white reflection layer 76, the whole face of which is printed with white printing ink, is formed on a side of the ITO electro-conductive film 24 formed on the glass substrate 22. Thereon, the colored layer 54, which is printed with the regularly arranged stripe shapes with inks for red, green and blue color filters as shown in FIG. 10 (colored layers 54R, 54G and 54B), is formed. In the present embodiment, the width of the stripes of each color is set to 0.4 mm, and the stripes are arranged in a repeating sequence of red, green, blue. The white reflection layer 76 is formed more thinly than the white reflection layer 26 in the embodiments described above, and features permeability to light. Here, the reflectance of the white reflection layer 76 is 50%. A white reflection layer need not be provided in the structure of the back substrate 74; a colored layer having transparency may be provided alone.

An image display device 72 is structured with the image display medium 70, the voltage application section 36, the electrode head 32 and a back light 78. The back light 78 is disposed near to or abutting the back substrate 74 side of the image display medium 70.

The electrode head 32 is the same as the electrode head 32 used in the first embodiment. The electrode head 32 is scanned along the display face of the image display medium 70 in the same manner as shown in FIG. 4. The voltage application section 36 applies voltages between the isolated electrodes 38 of the electrode head 32 and the ITO electro-conductive film 24 of the back substrate 74. The back light 78 has a structure which employs an ordinary cold cathode tube as a light source, and implements uniform light irradiation to the whole face of a display region with a prism sheet.

An image display process of the image display medium 70 is the same as in the embodiments described above. A high contrast monochrome display can be implemented by applying pulse voltages of +200 V and −200 V to the isolated electrodes 38 arbitrarily in accordance with image information. In addition, by applying alternating pulse voltages of ±200 V at 200 Hz frequency to freely selected isolated electrodes 38 of the electrode head 32 and connecting others of the isolated electrodes 38 to ground, the white particles 18 and black particles 20 at regions at which alternating pulse electric fields are effected can be moved to regions at which the alternating pulse electric fields are not effected. Thus, the colors of freely selected regions of the colored layer 54 (colored layers 54R, 54G and 54B) formed at the back substrate 74 can be displayed at the display substrate 12 side.

Here, because the reflectance of the white reflection layer 76 formed at the back substrate 74 of the image display medium 70 is set to 50%, multi-color display is slightly darker than in the image display medium 50 described for the second embodiment (in which the reflectance of the white reflection layer 26 is 88%). However, in locations where the environment is bright, multi-color display can be provided without particular problems.

If the image display medium 50 and the image display medium 70, at which multi-color images are formed, are observed in a location where the surroundings are dark, the image is darker for both thereof, and display quality is reduced. However, if the back light 78 is lit up, light is transmitted through the back substrate 74 of the image display medium 70, and the multi-color image becomes brighter. Thus, a multi-color image of the image display medium 70 can be satisfactorily observed even in places where the environment is dark.

Fifth Embodiment

Next, a fifth embodiment of the present invention will be described. Parts that are the same as in the embodiments described above are given the same reference numerals, and detailed descriptions thereof are omitted.

Figure 19:
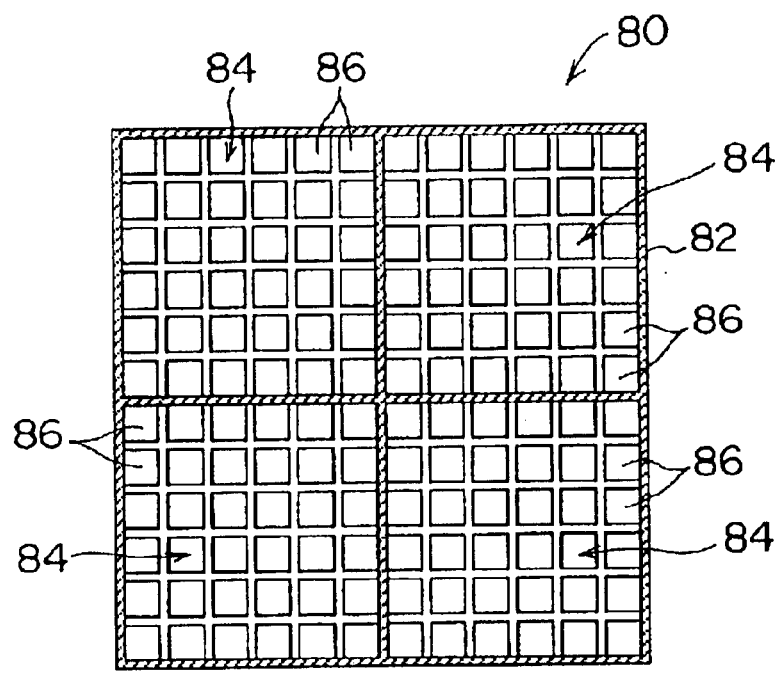
FIG. 19 is a plan view showing an image display medium relating to a fifth embodiment.

FIG. 19 shows a partially enlarged plan view of an image display medium 80 relating to the present embodiment, as viewed from a display substrate side. Inter-substrate space of the image display medium 80 is divided into a plurality (four in FIG. 19) of cells 84 by a spacer 82.

For simplicity of explanation, the smallest pixel units of a display image are shown as pixels 86. In the present embodiment, the pixels 86 are disposed 6 by 6 in each of the cells 84. Other structures are the same as in the embodiments described above, and a display process is also the same as in the embodiments described above. Accordingly, descriptions thereof are omitted.

In this image display medium 80, because the inter-substrate space is divided into the cells, uneven distribution of the particles can be prevented. When various multi color images were successively re-written 50 times to the image display medium 80 using the electrode head 32, and thereafter displayed multi-color images were inspected, preferable multi-color images were being displayed. In contrast, when various multi-color images were successively rewritten 50 times to an image display medium whose inter-substrate space was not divided into cells, and thereafter displayed multi color images were inspected, there was an unevenness of display, which was thought to be due to deviation of the particles.

In order to erase multi-color images, an alternating pulse voltage of ±200 V at 200 Hz frequency was applied to the whole of display regions of these image display mediums. Resultant uniformization of the distribution of particles in the image display medium which was not divided into cells took several seconds. In contrast, in the image display medium 80 whose inter-substrate space was divided into a plurality of cells, the distribution of particles could be made uniform in one second or less.

Because movement of particles is limited to within the cells in a case in which the image display medium 80 whose inter-substrate space is divided into cells is utilized, it is not necessary to effect an alternating electric field over the whole of the display region of the image display medium 80 simultaneously when erasing a multi-color image. Accordingly, erasure of a multi-color image can be implemented by effecting alternating electric fields separately at the cell regions divided by the spacer 82, using an image erasure apparatus which effects alternating electric fields to the cell regions separately. For example, by employing an image erasure apparatus which has at least one erasure electrode whose form corresponds to an individual cell region and effecting alternating electric fields only at cell regions at which erasure of the multi-color image is required, the image can be satisfactorily erased at the regions at which the alternating electric field is effected. Here, there is no particular problem with effects on neighboring cell regions.

Thus, when the inter-substrate space of an image display medium is divided into a plurality of cells, deviations of particles are limited to within the cells and, even if displays of multi-color images are implemented successively, the displays can be implemented reliably. Further, erasure of multi-color images can be performed in a short time and, because an image erasure apparatus can effect alternating electric fields at the divided cells individually, a reduction in size of the image erasure apparatus is enabled.

Sixth Embodiment

Next, a sixth embodiment of the present invention will be described. Parts that are the same as in the embodiments described above are given the same reference numerals, and detailed descriptions thereof are omitted.

Figure 20:
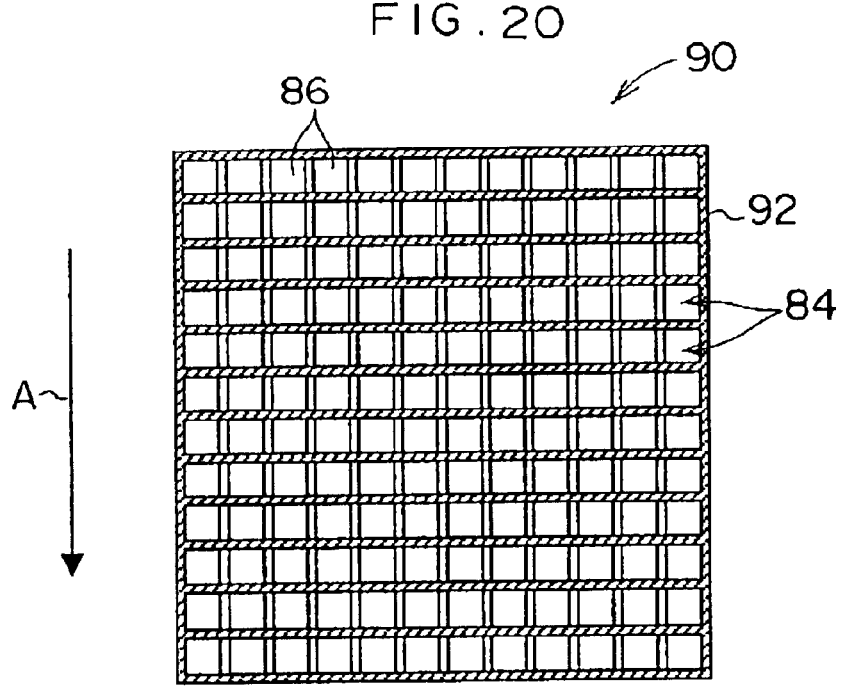
FIG. 20 is a plan view showing an image display medium relating to a sixth embodiment.

FIG. 20 shows a partially enlarged plan view of an image display medium 90 relating to the present embodiment, as viewed from a display substrate side. Inter-substrate space of the image display medium 90 is divided into individual pixel rows, lined up along a direction transverse to an image writing direction (the direction of arrow A in the drawing) by a spacer 92.

In the present embodiment, the pixels 86 are disposed as a single 1 by 12 row in each of the cells 84. Other structures are the same as in the embodiments described above, and a display process is also the same as in the embodiments described above. Accordingly, descriptions thereof are omitted.

In this image display medium 90, because the inter-substrate space is divided into the individual pixel rows arranged along the direction transverse to the scanning direction (image writing direction) of the electrode head 32, even if image display is performed successively for pixels arranged in the scanning direction of the electrode head 32, particles will not be returned, by image writing to a subsequent pixel, to a pixel from which particles have already been moved aside, and an excellent multi-color image can be displayed with a single scan.

In contrast, in a case in which image display is performed successively for pixels arranged in the scanning direction of the electrode head 32 in an image display medium in which the inter-substrate space is not divided into cells, particles will be returned, by image writing at a subsequent pixel, to a pixel from which particles have already been moved aside, and there may be cases in which display quality of a multi-color image will be reduced.

Thus, because the inter-substrate space of the image display medium 90 is divided into the individual pixel rows arranged along the direction transverse to the image writing direction, display of successive multi-color images can be implemented reliably. Further, uniformization of particle distributions can be performed in a short time. Further yet, an excellent multi-color image can be displayed with just a single scan of the electrode head 32.

Seventh Embodiment

Next, a seventh embodiment of the present invention will be described. Parts that are the same as in the embodiments described above are given the same reference numerals, and detailed descriptions thereof are omitted.

Figure 21:
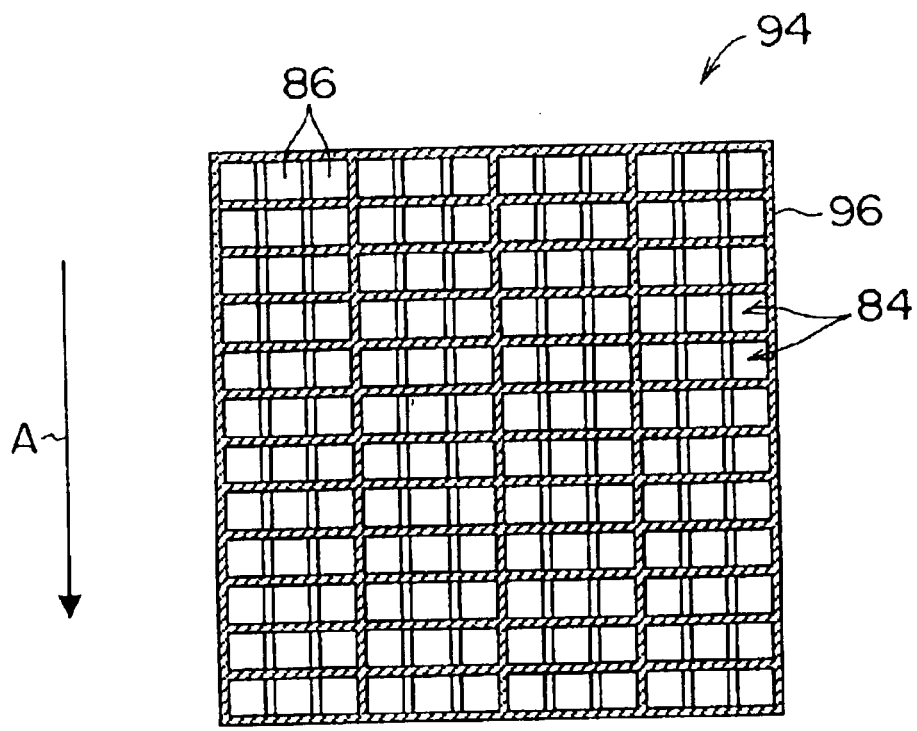
FIG. 21 is a plan view showing an image display medium relating to a seventh embodiment.

FIG. 21 shows a partially enlarged plan view of an image display medium 94 relating to the present embodiment, as viewed from a display substrate side. Inter-substrate space of the image display medium 94 is divided into individual pixel rows, lined up along the direction transverse to the image writing direction (the direction of arrow A in the drawing) by a spacer 96, and each of the cells 84 is formed of three of the pixels 86 that form the smallest pixels of a multi-color display image. In other words, in the present embodiment, the individual cells 84 are 1 by 3 pixels 86.

A substrate at which the colored layer 54, at which red, green and blue are regularly arranged in the same way as in the second embodiment, or the colored layer 64, at which yellow, magenta and cyan are regularly arranged in the same way as in the third embodiment, is formed can be employed at a back substrate of the image display medium 94. Furthermore, the three colors of the colored layer (red, green and blue or yellow, magenta and cyan) are disposed at positions that correspond to three pixels of the respective pixels 86, which are divided up into the units of 1 by 3 pixels by the spacer 96. Other structures are the same as in the embodiments described above, and a display process is also the same as in the embodiments described above. Accordingly, descriptions thereof are omitted.

Thus, because uneven distributions of particles can be prevented because of division into three-pixel sets by the spacer 96, successive displays of multi-color images can be implemented more consistently than in the image display medium 80 described for the fifth embodiment. Moreover, during multi-color image erasure, particle distribution can be made uniform in a shorter time. Moreover again, as in the sixth embodiment, an excellent multi-color image can be displayed by a single pass of the electrode head 32.

Eighth Embodiment

Next, an eighth embodiment of the present invention will be described. Parts that are the same as in the embodiments described above are given the same reference numerals, and detailed descriptions thereof are omitted.

Figure 22:
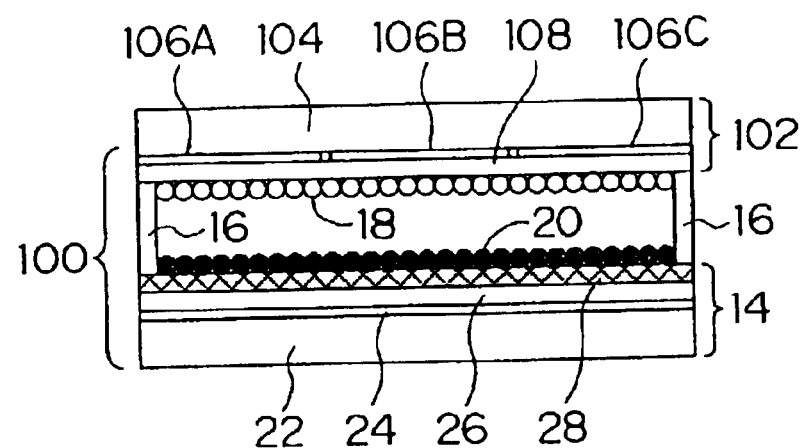
FIG. 22 is a sectional view showing structure of an image display medium relating to an eighth embodiment.

FIG. 22 shows general structure of an image display medium 100 relating to the present embodiment. The image display medium 100 is structured with a transparent display substrate 102, the back substrate 14, the spacer 16, and the white particles 18 and the black particles 20. The display substrate 102 is provided at a side at which an image is displayed. The back substrate 14 opposes the display substrate 12 with a small gap therebetween. The spacer 16, which is for fixedly maintaining inter-substrate spacing, and the white particles 18 and the black particles 20, whose charge characteristics are different, are enclosed between the display substrate 12 and the back substrate 14.

The display substrate 102 is structured with a glass substrate 104, an ITO electro-conductive layer 106, and a surface coating layer 108, which are laminated. The display substrate 102 employs the glass substrate 104, on which the ITO electro-conductive layer 106 is formed with a thickness of 1.1 mm. The ITO electro-conductive layer 106 is formed by carrying out chemical etching using a photo-masking pattern, and includes pattern electrodes 106A, 106B and 106C in the form of a pattern that is desired in accordance with a display image. The surface coating layer 108 is formed at the back substrate 14 side of the ITO electro-conductive layer 106 by coating a transparent polycarbonate resin to a thickness of 5 μm.

The back substrate 14 is the same as in the first embodiment. In the present embodiment, the ITO electro-conductive layer 106 of the display substrate 102 is patterned. However, the ITO electro-conductive film 24 of the back substrate 14 may be patterned, or both the ITO electro-conductive layer 106 of the display substrate 102 and the ITO electro-conductive film 24 of the back substrate 14 may be patterned.

Figure 23:
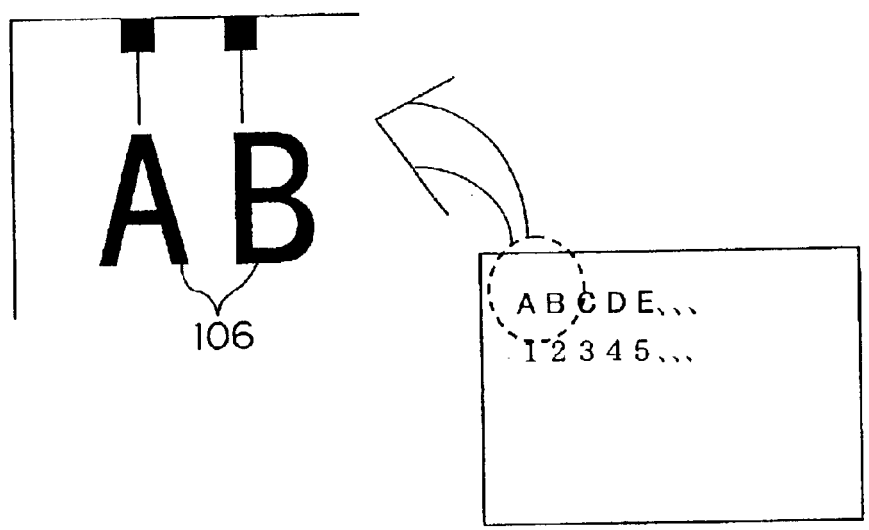
FIG. 23 is a diagram for describing the shape of electrodes of the image display medium relating to the eighth embodiment.

FIG. 23 shows an example of an electrode pattern of the ITO electro-conductive layer 106 that is formed at the display substrate 102 of the image display medium 100. In this example, a text pattern with a letter size of about 10 mm is formed. The pattern of each letter is formed as a single electrode, and voltage can be applied to each letter independently. Regions other than a letter portion are completely covered with background electrodes having a spacing of 0.05 mm from the letter portion, and voltages can be applied thereto simultaneously. For example, in the case of the pattern electrodes 106A, 106B and 106C of the display substrate 102 shown in FIG. 22, a letter pattern electrode corresponds to the pattern electrode 106B, and the pattern electrodes 106A and 106C correspond to background electrodes. Thus, a letter pattern display or an inverted display of the letter pattern display can be implemented.

Figure 24:
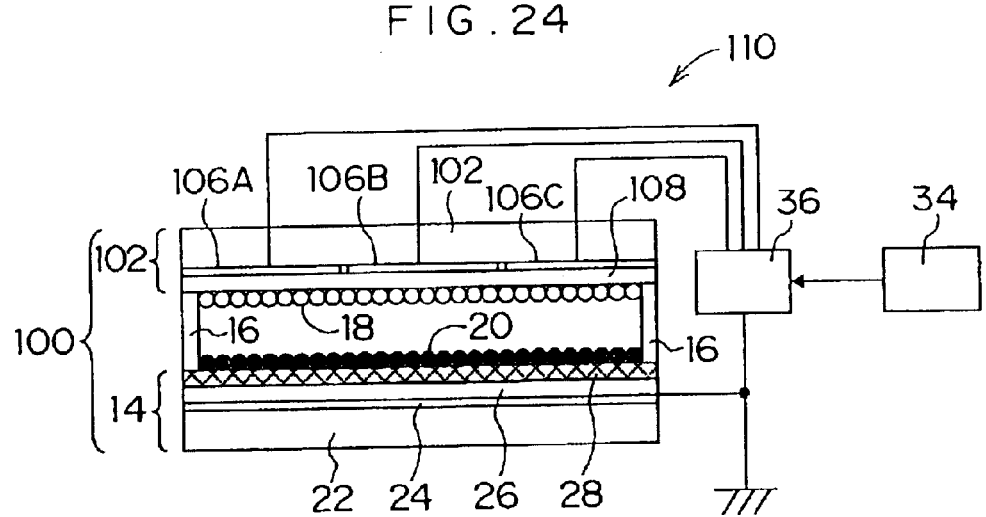
FIG. 24 is a schematic structural view of an image display device relating to the eighth embodiment.

FIG. 24 shows general structure of an image display device 110 which utilizes the image display medium 100. The image display device 110 is structured with the image display medium 100 and the voltage application section 36. The voltage application section 36 selectively applies dc voltage or ac voltage between the pattern electrodes 106A, 106B and 106C formed at the display substrate 102 and the ITO electro-conductive film 24 of the back substrate 14 in accordance with image information inputted from the external image input apparatus 34.

Next, an image display process of the image display medium 100 will be described. From the white display state shown in FIG. 24, first, the pattern electrodes 106A and 106C of the display substrate 102 are connected to ground, and a pulse voltage of −140 V is applied to the pattern electrode 106B. Consequently, at a region of the image display medium 100 that faces the pattern electrode 106B, the negatively charged white particles 18 move toward the back substrate 14 side, and the positively charged black particles 20 move toward the display substrate 102 side. Thus, excellent black display can be implemented.

Then, if a pulse voltage of +140 V is applied to the pattern electrode 106B, the white particles 18 and black particles 20 at the region facing the pattern electrode 106B move back in the opposite directions, and return from the black display state to the white display state shown in FIG. 24. In the same way, by applying pulse voltages of +140 V and −140 V arbitrarily to the letter pattern electrodes and the background electrodes in accordance with image information, a high contrast monochrome image display can be implemented.

Next, the pattern electrodes 106A and 106C of the display substrate 102 may be connected to ground, and an alternating pulse voltage of ±140 V at 200 Hz frequency may be applied to the pattern electrode 106B. Consequently, the white particles 18 and the black particles 20 are almost completely eliminated from the region facing the pattern electrode 106B, and the red color of the colored layer 28 formed at the back substrate 14 can be satisfactorily observed from the display substrate 102 side. Thus, when the pattern electrodes 106A and 106C (background electrodes) are connected to ground and an alternating pulse voltage of +140 V at 200 Hz frequency is arbitrarily applied to the letter pattern electrodes in accordance with image information, an excellent red text image can be displayed. Further, erasure of the red text image can be implemented by applying an alternating pulse voltage of ±140 V at 200 Hz frequency to all of the pattern electrodes 106A, 106B and 106C of the display substrate 102.

Next, taking the uniform white display state shown in FIG. 24 as an initial display state, an alternating pulse voltage of ±140 V at 200 Hz frequency can be applied to the pattern electrode 106B of the display substrate 102 for various numbers of cycles. The final pulse voltage of this alternating pulse voltage is specified to be −140 V. Up to a small number of cycles, a favorable black display is implemented. As the number of cycles is increased further however, density of the text gradually falls. When the number of cycles goes beyond 20 cycles, the particles are almost entirely eliminated and excellent red text is displayed.

Thus, in the image display device 110, by dc electric fields and/or low frequency alternating electric fields being effected between the substrates of the image display medium 100 in accordance with image information, a high contrast display image can be provided by two kinds of particles, in the same way as in conventional image display mediums. Further, by applying alternating electric fields for large numbers of cycles in accordance with multi-color image information, the two kinds of colored particles can be moved to peripheries from freely selected locations, and the color that the back substrate is colored with can be displayed.

Ninth Embodiment

Next, a ninth embodiment of the present invention will be described. Parts that are the same as in the embodiments described above are given the same reference numerals, and detailed descriptions thereof are omitted.

Figure 25:
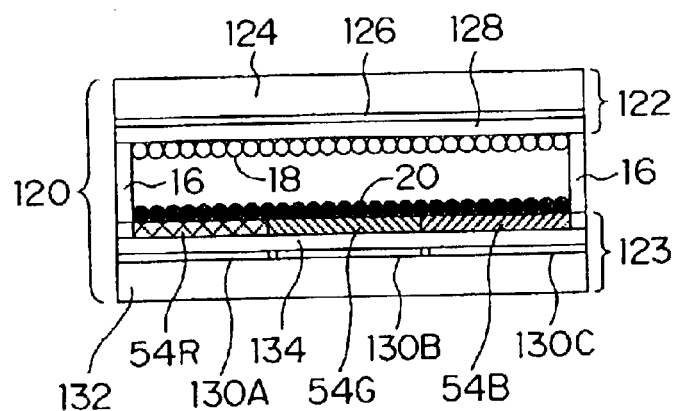
FIG. 25 is a sectional view showing structure of an image display medium relating to a ninth embodiment.

FIG. 25 shows general structure of an image display medium 120 relating to the present embodiment. The image display medium 120 is structured with a transparent display substrate 122, a colored back substrate 123, the spacer 16, and the white particles 18 and the black particles 20. The display substrate 122 is provided at a side at which an image is displayed. The back substrate 123 opposes the 12 with a small gap therebetween. The spacer 16, which is for fixedly maintaining inter-substrate spacing, and the white particles 18 and the black particles 20, whose charge characteristics are different, are enclosed between the display substrate 122 and the back substrate 123.

The display substrate 122 is structured with a glass substrate 124, an ITO electro-conductive layer 126, and a surface coating layer 128, which are laminated. The display substrate 122 employs the glass substrate 124, on which the ITO electro-conductive layer 126 is formed with a thickness of 1.1 mm. The surface coating layer 128 is formed at the back substrate 123 side of the ITO electro-conductive layer 126 by coating a transparent polycarbonate resin to a thickness of 5 µm.

In the same way as in the second embodiment, the back substrate 123 employs a glass substrate 132, on which an ITO electro-conductive layer 130 is formed with a thickness of 1.1 mm. A white reflection layer 134, the whole face of which is printed with white printing ink, is formed on a side of the ITO electro-conductive layer 130 formed on the glass substrate 132. Thereon, the colored layer 54, which is printed with the regularly arranged stripe shapes with the inks for red, green and blue color filters as shown in FIG. 10 (colored layers 54R, 54G and 54B), is formed.

In the present embodiment, patterning of the ITO electro-conductive layer 130 of the back substrate 123 is performed, and electrode groups 130A, 130B and 130C are formed in correspondence to the smallest pixels of a display image. More specifically, the forms of the electrode groups 130A, 130B and 130C are 0.38 mm by 0.38 mm square shapes with a pitch for each electrode of 0.4 mm. Voltages can be applied to each of the electrodes independently. The width of the stripes of the colored layers 54R, 54G and 54B is set to 0.4 mm, and the colored layers 54R, 54G and 54B are disposed in correspondence with the electrode groups 130A, 130B and 130C.

Figure 26:
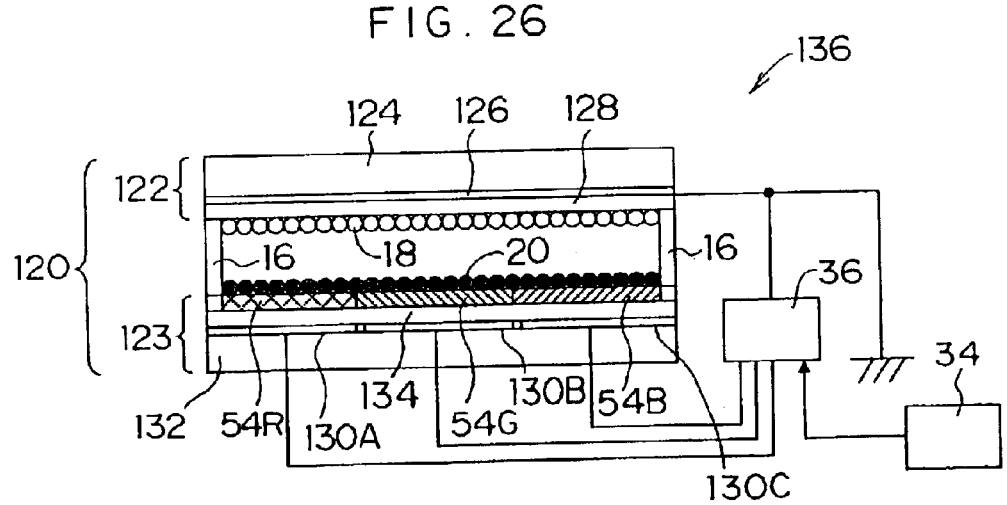
FIG. 26 is a schematic structural view of an image display device relating to the ninth embodiment.

FIG. 26 shows general structure of an image display device 136 which utilizes the image display medium 120. The image display device 136 is structured with the image display medium 120 and the voltage application section 36. The voltage application section 36 selectively applies dc voltage and/or ac voltage between the ITO electro-conductive layer 126 of the display substrate 122 and the electrode groups 130A, 130B and 130C formed at the back substrate 123 in accordance with image information inputted from the external image input apparatus 34.

Next, an image display process of the image display medium 120 will be described. In the same manner as in the eighth embodiment, a dc electric field or alternating electric field is effected between the substrates of the image display medium 120 in accordance with image information, such that a high contrast monochrome display image can be provided by the white particles 18 and the black particles 20. Here, loss of resolution when a monochrome image is displayed does not occur, and thus is not particularly problematic.

Further, by effecting alternating electric fields for large numbers of cycles between the substrates of the image display medium 120 in accordance with multi-color image information, the white particles 18 and black particles 20 are moved from freely selected locations of the colored layers 54R, 54G and 54B, which are provided regularly at the back substrate 123, to peripheries thereof. Thus, arbitrary colors of red, green and blue can be displayed.

Here, an arbitrary color can be displayed by expressing a single color pixel by moving the particles at a freely selected combination of colored layers of the regularly disposed colored layers 54R, 54G and 54B to the peripheries and thus displaying those colored layers at the display substrate 122 side.

Because, in the image display medium 120, white display is implemented by the white particles 18, whiteness of the white display is not subject to flaws, and because black display is implemented by the black particles 20, the black display will not become gray.

In a case in which a monochrome image is to be displayed mixedly with a multi-color image, the dc electric fields or low cycle number alternating electric fields for displaying the monochrome image and the high cycle number alternating electric fields for displaying the multi-color image may be effected between the substrates of the image display medium 120 at respective regions of the monochrome image display and the multi-color image display at the same time. Thus, the monochrome image and the multi-color image can be mixedly displayed.

If the monochrome image and the multi-color image are thus displayed at the same time, the monochrome image display may deteriorate at boundary portions between monochrome image display portions and multi-color image display portions, due to effects of the alternating pulse electric fields for displaying the multi-color image.

In such a case, first the dc electric fields or low cycle number alternating electric fields can be effected between the substrates of the image display medium 120 in accordance with monochrome image information to implement display of the monochrome image, and subsequently the high cycle number alternating electric field can be effected in accordance with multi-color image information to implement display of the multi-color image. Thus, display noise of the monochrome image display and display deterioration at boundary portions between the monochrome image display portions and the multi-color image display portions can be reduced.

Erasure of a multi-color display image can be implemented by applying a high cycle number alternating pulse voltage to all of the electrode groups 130A, 130B and 130C of the back substrate 123. Moreover, when multi-color displays are to be successively implemented, display of a succeeding multi-color image may be implemented without a previous multi-color image having been erased. Here, the inter-substrate space of the image display medium 120 in the present embodiment is divided into a plurality of cells by the spacer 16. Therefore, deviations of the particles are limited to within the cells and, even if displays of multi-color images are implemented successively, display can be implemented reliably. Moreover again, erasure of multi-color images can be performed in a short time and, even if the image display device applies alternating pulse voltages at the divided cell regions individually, the multi-color images can be excellently erased.

Tenth Embodiment

Next, a tenth embodiment of the present invention will be described. Parts that are the same as in the embodiments described above are given the same reference numerals, and detailed descriptions thereof are omitted.

Figure 27:
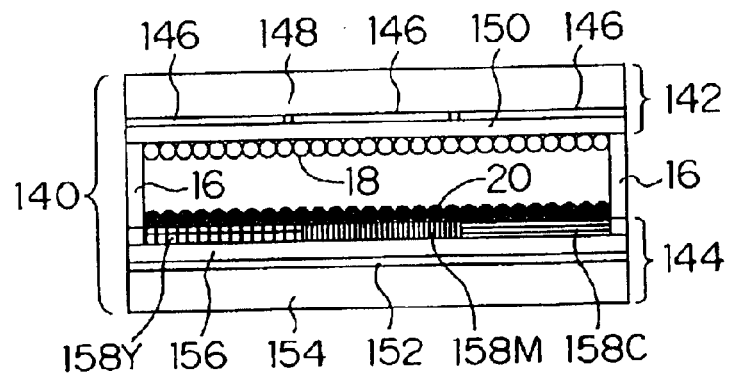
FIG. 27 is a sectional view showing structure of an image display medium relating to a tenth embodiment.

FIG. 27 shows general structure of an image display medium 140. The image display medium 140 is structured with a transparent display substrate 142, a colored back substrate 144, the spacer 16, and the white particles 18 and the black particles 20. The display substrate 142 is provided at a side at which an image is displayed. The back substrate 144 opposes the display substrate 12 with a small gap therebetween. The spacer 16 is for fixedly maintaining inter-substrate spacing. The white particles 18 and the black particles 20, whose colors and charge characteristics are different, are enclosed between the substrates. Although not shown in the drawing, the inter-substrate space of the image display medium 140 is divided into each of pixel rows along a direction transverse to an image writing direction, and into units of three of pixels that form the smallest pixels of a multi-color image display, by the spacer 16.

Figure 28A:
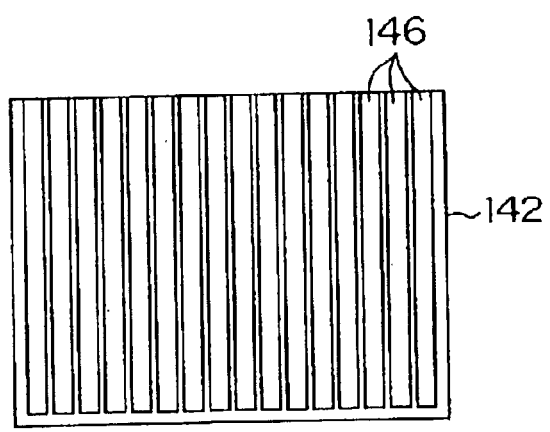
FIGS. 28A and 28B are diagrams for explaining linear electrodes of the image display medium relating to the tenth embodiment.

The image display medium 140 employs a glass substrate 148, on which an ITO electro-conductive layer 146 is formed to a thickness of 1.1 mm, as the display substrate 142. The ITO electro-conductive layer 146 is subjected to patterning, and thus linear electrodes 146 are formed as shown in FIG. 28A. The linear electrodes 146 correspond to units of pixel rows in a vertical direction of a display image, and are specifically formed with a width of 0.38 mm and a pitch of 0.4 mm. A surface coating layer 150 is formed at the back substrate 144 side of the ITO electro-conductive layer 146 by coating a transparent polycarbonate resin to a thickness of 5 μm.

Figure 28B:
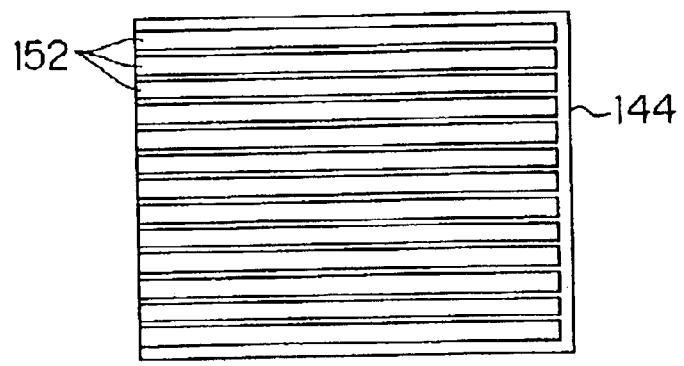

Similarly to the display substrate 142, the back substrate 144 employs a glass substrate 154, on which an ITO electro-conductive layer 152 is formed to a thickness of 1.1 mm. The ITO electro-conductive layer 152 is subjected to patterning, and thus linear electrodes 152 are formed as shown in FIG. 28B. The linear electrodes 152 correspond to units of pixel rows in a horizontal direction of the display image, and are formed specifically with a width of 0.38 mm and a pitch of 0.4 mm.

The linear electrodes 146 formed at the display substrate 142 and the linear electrodes 152 formed at the back substrate 144 are disposed such that the linear electrodes 146 and the linear electrodes 152 intersect when the image display medium 140 is formed.

In the back substrate 144, similarly to the third embodiment, a white reflection layer 156 is formed on the ITO electro-conductive layer 152, and colored layers 158Y, 158M and 158C, which are regularly arranged stripe shapes applied with inks for yellow, magenta and cyan color filters, are formed on the white reflection layer 156.

The colored layers 158Y, 158M and 158C are formed so as to face the linear electrodes 146 formed at the display substrate 142. The width of each stripe is set to, for example, 0.4 mm with a pitch of 0.4 mm. The white reflection layer 156 is formed to be thin, having permeability to light. Here, reflectance of the white reflection layer 156 is about 50 percent. No white reflection layer need be formed at the back substrate 144, and it is sufficient to provide the optically transmissive colored layers. The colored layers 158Y, 158M and 158C formed by the back substrate 144 may be formed to run along the linear electrodes 152 formed at the back substrate 144.

Figure 29:
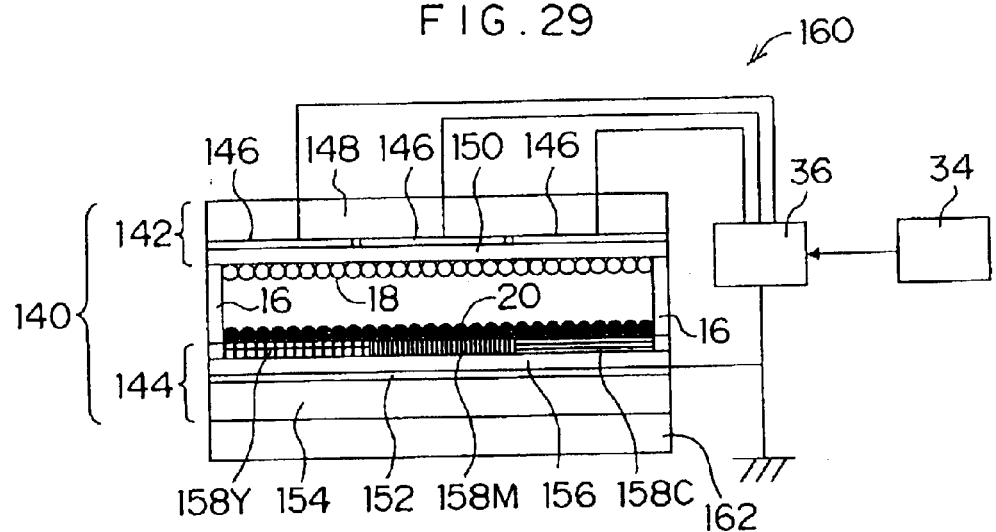
FIG. 29 is a schematic structural view of an image display device relating to the tenth embodiment.

FIG. 29 shows general structure of an image display device 160 which utilizes the image display medium 140. The image display device 160 is structured with the image display medium 140, the voltage application section 36 and a back light 162. The back light 162 is disposed near to or abutting the back substrate 144 side of the image display medium 140. The voltage application section 36 selectively applies dc voltage or ac voltage between the linear electrodes 146 of the display substrate 142 and the linear electrodes 152 formed at the back substrate 144 in accordance with image information inputted from the external image input apparatus 34. The back light 162 is similar to the back light described for the fourth embodiment.

Figure 30:
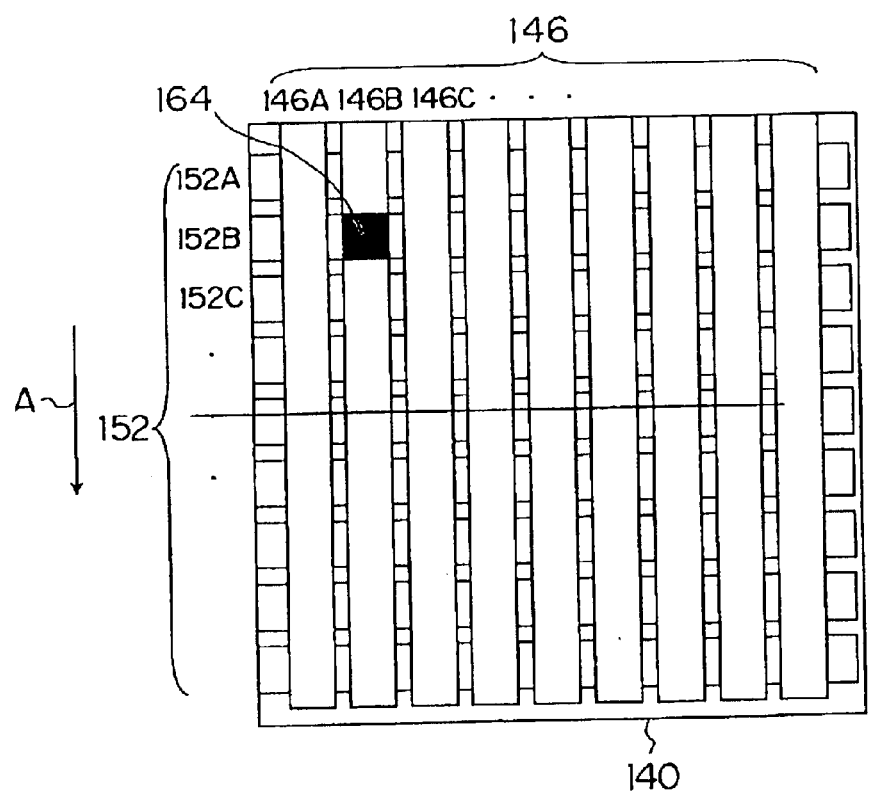
FIG. 30 is a plan view for explaining an image display method of the image display medium relating to the tenth embodiment.

Next, an image display process of the image display medium 140 will be described. As shown in FIG. 30, the image display medium 140 has a simple matrix driving type structure, in which the linear electrodes 146 formed at the display substrate 142 and the linear electrodes 152 formed at the back substrate 144 are disposed so as to intersect one another. In simple matrix driving, an image writing voltage (scanning voltage) is applied sequentially to the linear electrodes in one direction. At the same time, an image writing voltage (image signal voltage) is applied to the linear electrodes in the other direction, in accordance with image information.

In the present embodiment, the scanning voltage is applied to the linear electrodes 152 of the back substrate 144, and the image signal voltage is applied to the linear electrodes 146 of the display substrate 142. A scanning direction of the scanning voltage applied to the linear electrodes 152 of the back substrate 144 is set to the direction of arrow A shown in FIG. 30.

Firstly, a scanning voltage Vron is applied to a first linear electrode 152A of the back substrate 144, and the other linear electrodes 152 are connected to ground. At the same time as this, in accordance with image information that corresponds to the first linear electrode 152A of the back substrate 144, an image signal voltage Vcon is applied to the linear electrodes 146 of the display substrate 142 that are in an image portion, and the linear electrodes 146 of the display substrate 142 that are in a non-image portion are connected to ground. Consequently, an image can be displayed at a pixel row corresponding to the first linear electrode 152A of the back substrate 144.

Next, the scanning voltage Vron is applied to a second linear electrode 152B of the back substrate 144, and the other linear electrodes 152 are connected to ground. At the same time as this, in accordance with image information that corresponds to the second linear electrode 152B of the back substrate 144, the image signal voltage Vcon is applied to the linear electrodes 146 of the display substrate 142 that are in an image portion, and the linear electrodes 146 of the display substrate 142 that are in a non-image portion are connected to ground. Consequently, an image is displayed at a pixel row corresponding to the second linear electrode 152B of the back substrate 144. Thereafter, this is repeated sequentially until the last of the linear electrodes 152 of the back substrate 144, and a desired image can be displayed.

For example, if a pixel at an intersection point 164 of the second linear electrode 152B of the back substrate 144 and a linear electrode 146B of the display substrate 142 is to be displayed, a voltage Vcon −Vron is applied to the pixel of the intersection point 164, and an image is displayed. At this time, besides the intersection point 164, the voltage −Vron is simultaneously applied to the pixel row along the second linear electrode 152B of the back substrate 144, and the voltage Vcon is simultaneously applied to the pixel row along the linear electrode 146B of the display substrate 142. Accordingly, it is a prerequisite condition for carrying out the simple matrix driving that the particles are not moved so as to display an image by a voltage of either Vcon or −Vron.

FIG. 31 shows a relationship between voltage applied to the image display medium 140 employed in the present embodiment and display density (reflection density). These image display density results are from a case in which all of the linear electrodes 152 of the back substrate 144 were connected to ground and pulse voltages were applied to all of the linear electrodes 146 of the display substrate 142.

Measurement of the image display density (reflection density) was carried out with an X-RITE 404 (manufactured by X-Rite). As is clear from FIG. 31, in a case in which black display is to be implemented at the image display medium 140 from a white display state, the display is not implemented until the voltage reaches and goes beyond about −60 V. Further, in a case in which white display is implemented from a black display state, the display is not implemented until the voltage is reaches and goes beyond about +60 V. Accordingly, when, for example, a black display is to be implemented from a white display state, a pulse voltage of +60 V is applied as the scanning voltage Vron, and a pulse voltage of −60 V is applied as the image signal voltage Vcon. Thus, a monochrome display image can be provided by the white particles 18 and the black particles 20.

In a case of displaying a multi-color image, an alternating pulse voltage of ±60 V at 200 Hz frequency is applied for 20 cycles as the scanning voltage Vron, and an alternating pulse voltage of ±60 V at 200 Hz frequency, with a phase difference from the scanning voltage Vron of 180°, is applied for 20 cycles as the image signal voltage Vcon. Consequently, the white particles 18 and the black particles 20 can be moved from freely selected locations of the colored layers 158Y, 158M and 158C, which are regularly disposed at the back substrate 144, to peripheries thereof in accordance with image information, and arbitrary colors of yellow, magenta and cyan can be displayed. By expressing a single pixel by combining arbitrary colored layers of the regularly arranged colored layers 158Y, 158M and 158C, arbitrary colors can be displayed.

The inter-substrate space of the image display medium 140 is divided by the spacer 16 into pixel rows along the direction transverse to the image writing direction (the direction of arrow A in the drawings), in the same way as in FIG. 20 or FIG. 21, that is, correspondingly with the linear electrodes 152 formed at the back substrate 144. Therefore, even if multi-color display is carried out at successive pixels along the image writing direction (the scanning direction), a satisfactory multi-color image can be displayed in a single scan without the colored particles being moved back again, by image writing of subsequent pixels, to pixels from which the colored particles have already been moved aside.

In the image display medium 140, because white display is implemented by the white particles 18, whiteness of the white display is not subject to flaws, and because black display is implemented by the black particles 20, the black display will not become gray. Moreover, resolution of a monochrome display image is not reduced. Further, because the reflectance of the white reflection layer 156 formed at the back substrate 144 is set to 50%, a multi-color image displayed at the image display medium 140 is slightly darker than in the image display medium 60 described for the third embodiment (in which the reflectance of the white reflection layer is 88%). However, in locations where the environment is bright, multi-color display can be provided without particular problem. In a location where the environment is dark, the image is darker, and display quality is reduced. However, when the back light 162 is lit up, light from the back light is transmitted through the optically transmissive back substrate 144, and the multi-color image can be displayed more brightly.

Erasure of the multi-color display image can be implemented by, for example, connecting all of the linear electrodes 152 of the back substrate 144 to ground and applying a large cycle number alternating pulse voltage to all of the linear electrodes 146 of the display substrate 142. Here, because the inter-substrate space of the image display medium 140 is divided into the plurality of cells by the spacer 16 in the present embodiment, erasure of the multi-color image can be implemented in a short time. Further, because the present embodiment is divided by the spacer 16 between individual pixel rows arranged along the direction transverse to the image writing direction, that is, along the respective linear electrodes 152 of the back substrate 144, erasure of the multi-color image can be implemented for the individual linear electrodes 152 of the back substrate 144.

When multi-color displays are to be successively implemented, display of a succeeding multi-color image can be implemented without erasing a previous multi-color image. Here, because the inter-substrate space of the image display medium 140 in the present embodiment is divided into a plurality of cells, deviations in distribution of the colored particles are limited to within the cells and, even if displays of multi-color images are implemented successively, display can be implemented reliably.

The present invention has the effect that a multi-color display can be implemented for a number of colors equal to or greater than a number of colors of particles, and a loss of resolution of images can be avoided.

What is claimed is:

1. An image display medium comprising:
   a display substrate which is at least capable of transmitting light;
   a back substrate opposing the display substrate with a gap therebetween; and
   a plurality of kinds of particle groups which differ in color and electrostatic charge characteristics differing in color from the back substrate and being sealed between the substrates so as to be movable between a plurality of divisions, into which plurality of divisions inter-substrate space between the display substrate and the back substrate is divided, in accordance with electric fields formed by voltages applied between the substrates at the respective divisions,
   wherein, under at least one electric field condition, the plurality of kinds of particle groups are moved to make at least a portion of the back substrate observable from the display substrate side.

2. The image display medium of claim 1, wherein, at at least one of the plurality of divisions, the color of the back substrate differs from color of the back substrate at another of the plurality of divisions which is adjacent to the one of the plurality of divisions.

3. The image display medium of claim 2, wherein colors of the back substrate at the various divisions include red, green and blue.

4. The image display medium of claim 2, wherein colors of the back substrate at the various divisions include yellow, magenta and cyan.

5. The image display medium of claim 4, further comprising a spacer for partitioning the inter-substrate space into cells that include portions of the plurality of divisions.

6. The image display medium of claim 5, wherein portions of the back substrate respectively corresponding to the plurality of divisions comprise rectangular shapes, the plurality of divisions neighboring one another at respective long sides thereof, and the spacer partitions the inter-substrate space such that the cells are formed in a direction intersecting a direction of the long sides.

7. The image display medium of claim 6, wherein the cells include portions of the plurality of divisions in which the divisions respectively differ in color of the back substrate.

8. The image display medium of claim 1, further comprising electrodes at the display substrate and the back substrate, which electrodes apply voltages for generating the electric fields, at least the electrode provided at the display substrate comprising a transparent electrode.

9. The image display medium of claim 8, wherein at least one of the electrode at the display substrate and the electrode at the back substrate comprises an isolated electrode group.

10. The image display medium of claim 8, wherein the electrodes comprise a plurality of linear electrodes, a linear electrode provided at the display substrate and a linear electrode provided at the back substrate being respectively disposed so as to intersect one another.

11. The image display medium of claim 9, wherein the back substrate is translucent.

12. The image display medium of claim 11, further comprising a back light which radiates light from an outer side of a face of the back substrate towards the display substrate.

13. The image display medium of claim 1, wherein the plurality of kinds of particle groups comprise a white particle group and a black particle group.

14. An image writing device comprising a voltage application apparatus which applies voltages for selectively generating at least one of dc electric fields and ac electric fields at respective divisions of an image display medium which includes:
    a display substrate which is at least capable of transmitting light;
    a back substrate opposing the display substrate with a gap therebetween;
    at least one kind of particle group differing in color from the back substrate and being sealed between the substrates so as to be movable between a plurality of divisions, into which plurality of divisions inter-substrate space between the display substrate and the back substrate is divided, in accordance with electric fields formed by voltages applied between the substrates at the respective divisions; and
    an image erasure apparatus which applies alternating voltage to all of the divisions that are included in at least one cell, for erasing a display image that is displayed at said at least one cell,
    wherein the image writing device generates the at least one of dc electric fields and ac electric fields for moving the particles in the inter-substrate space and, under at least one electric field condition, the particles are moved to make at least a portion of the back substrate observable from the display substrate side.

15. The image display medium of claim 14, wherein the voltage application apparatus comprises a plurality of electrodes disposed in a linear form, the voltage application apparatus applying the voltages for generating the electric fields while moving, relative to the image display medium, parallel to a face of the display substrate and at an outer side of the face of the display substrate.

16. The image display medium of claim 14, wherein, for implementing multi-color image display with colors of the particle group and the back substrate,
    the voltage application apparatus applies voltages in accordance with image information so as to form at least one of dc electric fields and, for a first predetermined number of cycles, ac electric fields, for moving the particles in a direction intersecting a face of the display substrate, and then
    the voltage application apparatus applies voltages in accordance with the image information so as to form ac electric fields for a second predetermined number of cycles, which is higher than the first predetermined number of cycles, for moving the particles in a direction parallel to the face of the display substrate.

* * * * *